(12) United States Patent  
Honda et al.

(10) Patent No.: US 8,045,033 B2
(45) Date of Patent: Oct. 25, 2011

(54) SOLID-STATE IMAGE SENSING DEVICE

(75) Inventors: Hiroto Honda, Yokohama (JP); Yoshinori Ilda, Tokyo (JP); Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 375 days.

(21) Appl. No.: 12/278,347

(22) PCT Filed: Jun. 5, 2008

(86) PCT No.: PCT/JP2008/060725
§ 371 (c)(1),
(2), (4) Date: Nov. 7, 2008

(87) PCT Pub. No.: WO2008/150021
PCT Pub. Date: Dec. 11, 2008

(65) Prior Publication Data
US 2010/0231770 A1   Sep. 16, 2010

(30) Foreign Application Priority Data
Jun. 6, 2007   (JP) .................. 2007-150608

(51) Int. Cl.
H04N 3/14 (2006.01)
H04N 5/335 (2011.01)
H04N 9/083 (2006.01)
H04N 9/04 (2006.01)
(52) U.S. Cl. ......... 348/308; 348/276; 348/277; 348/279
(58) Field of Classification Search .................. 348/308, 348/276–279
See application file for complete search history.

(56) References Cited

U.S. PATENT DOCUMENTS

| | | | |
|---|---|---|---|
| 3,971,065 A | 7/1976 | Bayer | |
| 6,570,616 B1 * | 5/2003 | Chen | 348/272 |
| 6,876,384 B1 | 4/2005 | Hubina et al. | |
| 7,031,515 B2 * | 4/2006 | Fuchigami | 382/165 |

(Continued)

FOREIGN PATENT DOCUMENTS

EP   1 241 896 A2   9/2002

(Continued)

OTHER PUBLICATIONS

Korean Office Action issued on Apr. 20, 2011 in corresponding Korean Application No. 10-2010-7000204 (with an English Translation).
U.S. Appl. No. 11/815,903, filed Aug. 9, 2007, Honda et al.

*Primary Examiner* — Sinh Tran
*Assistant Examiner* — Christopher K Peterson
(74) *Attorney, Agent, or Firm* — Oblon, Spivak, McClelland, Maier & Neustadt, L.L.P.

(57) ABSTRACT

A solid-state image sensing device has a plurality of pixels, a read-out circuit for reading out electric signals obtained by the photoelectric conversion element, and a signal processing unit for performing signal processing for the electric signal read out from the read-out circuit. The plurality of pixels include a first pixel having a transparent film, a plurality of second pixels each having a first color filter, a plurality of third pixels each having a second color filter, and a plurality of fourth pixels each having a third color filter. The signal processing unit has a color acquisition unit for acquiring a white pixel value and first to third color pixel values, an edge judgment unit, a color separation unit and a single color pixel calculation unit.

20 Claims, 16 Drawing Sheets

U.S. PATENT DOCUMENTS

| | | | |
|---|---|---|---|
| 7,474,343 B2 * | 1/2009 | Kohashi et al. | 348/234 |
| 7,626,619 B2 * | 12/2009 | Wada | 348/272 |
| 2004/0169747 A1 | 9/2004 | Ono et al. | |
| 2008/0180557 A1 | 7/2008 | Egawa et al. | |

FOREIGN PATENT DOCUMENTS

| | | |
|---|---|---|
| JP | 2002-369212 A | 12/2002 |
| JP | 2004-221839 A | 8/2004 |
| WO | WO 2007/145373 A2 | 12/2007 |

* cited by examiner

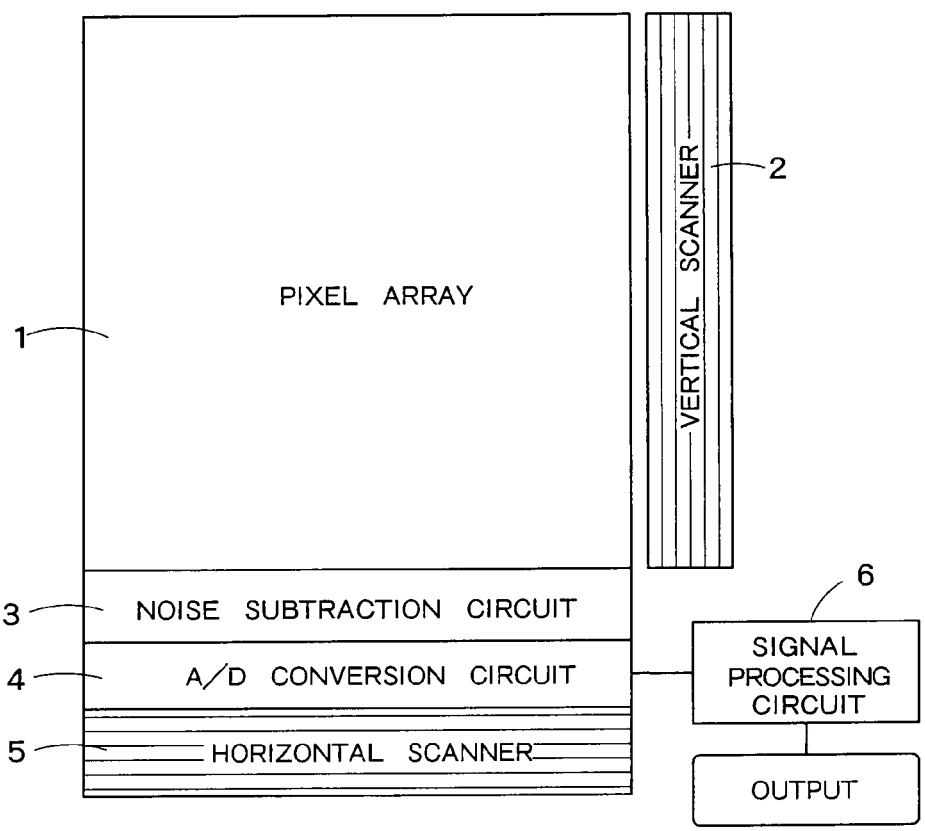
F I G. 1
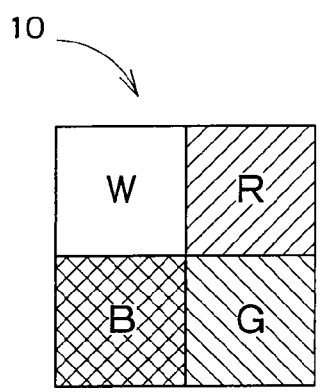
F I G. 2

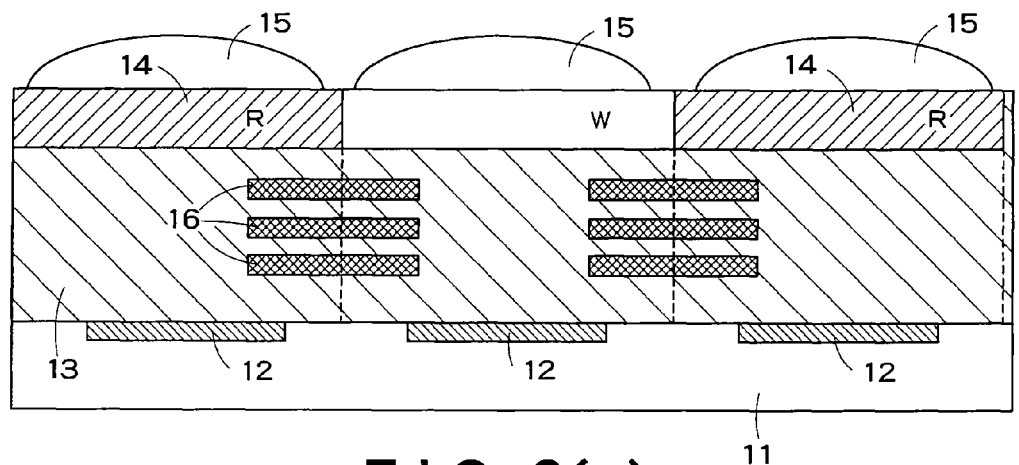
F I G. 6(a)
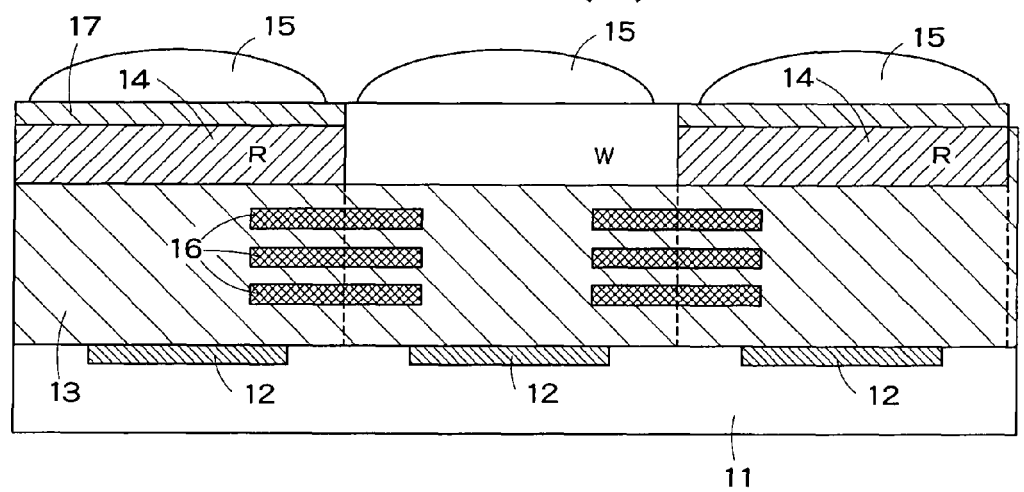
F I G. 6(b)
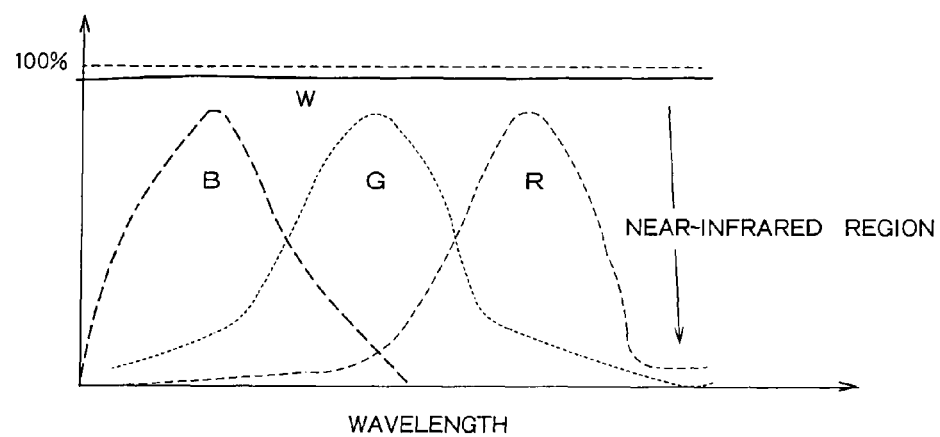
F I G. 7

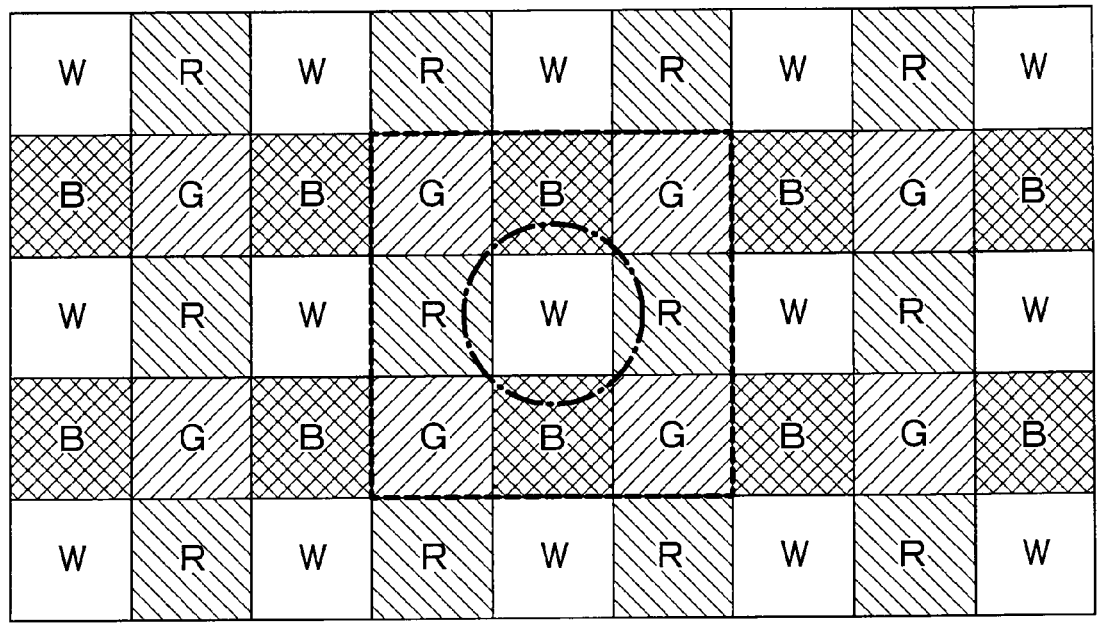
F I G. 8
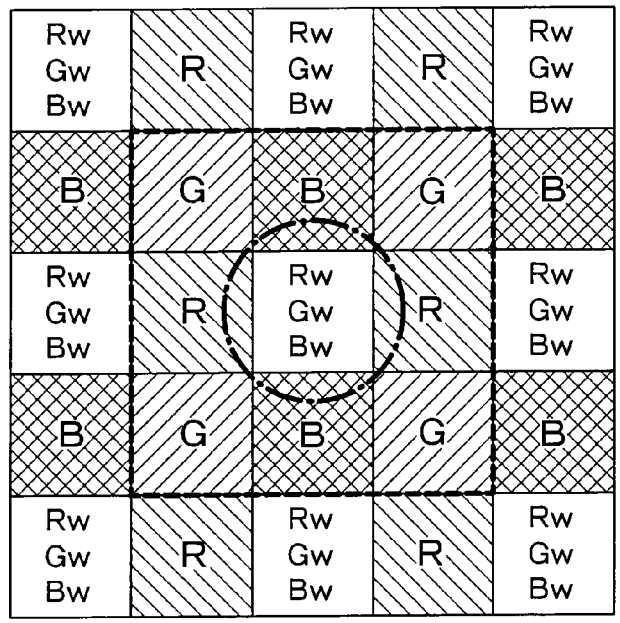
F I G. 9

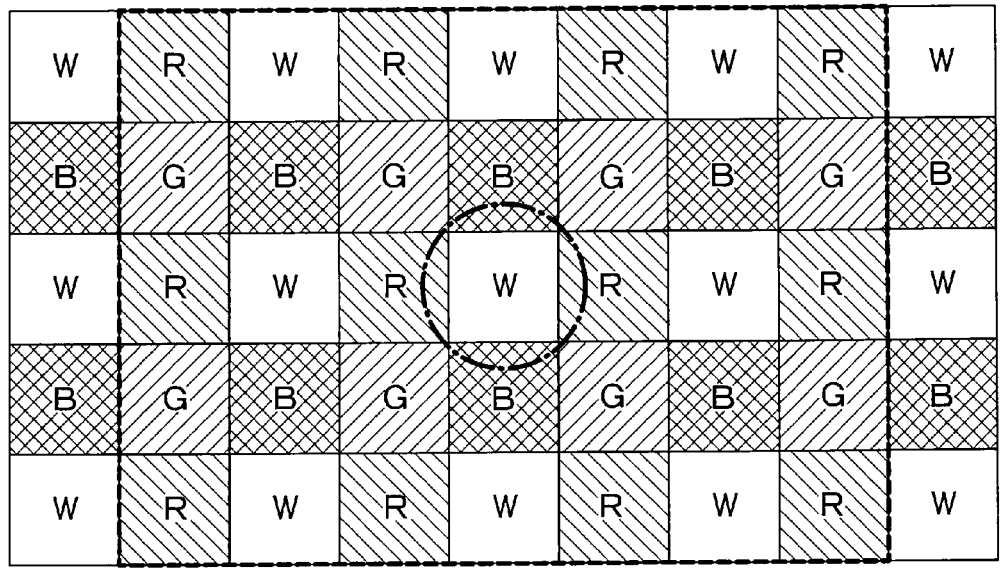
F I G. 10
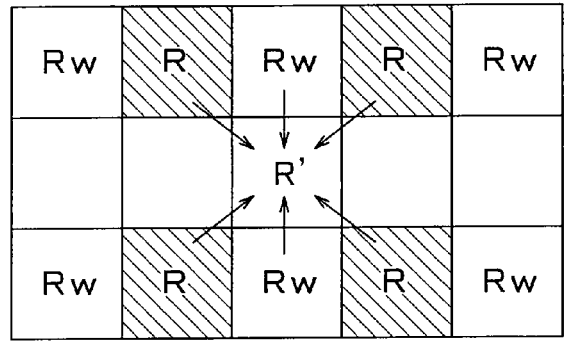
F I G. 11
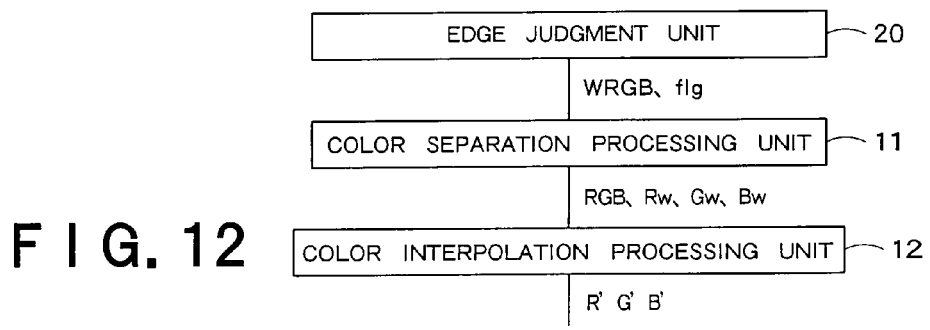
F I G. 12

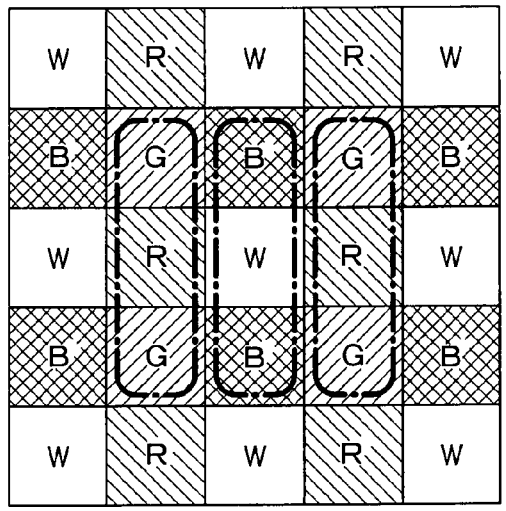
F I G. 14(a)
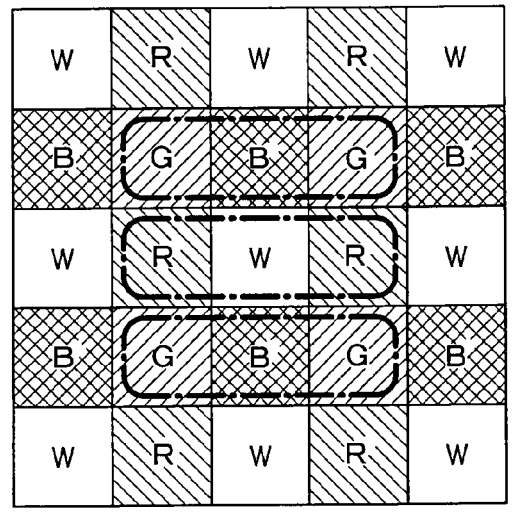
F I G. 14(b)
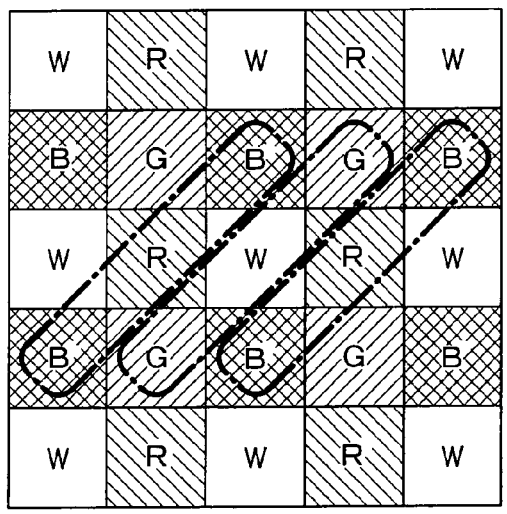
F I G. 14(c)
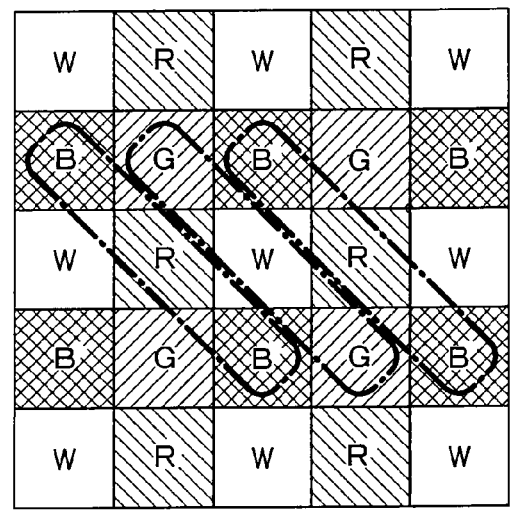
F I G. 14(d)

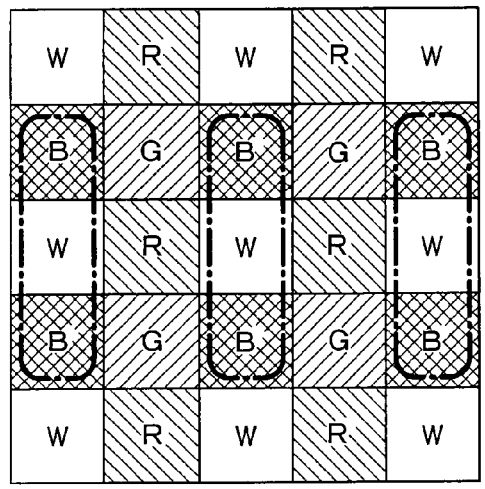
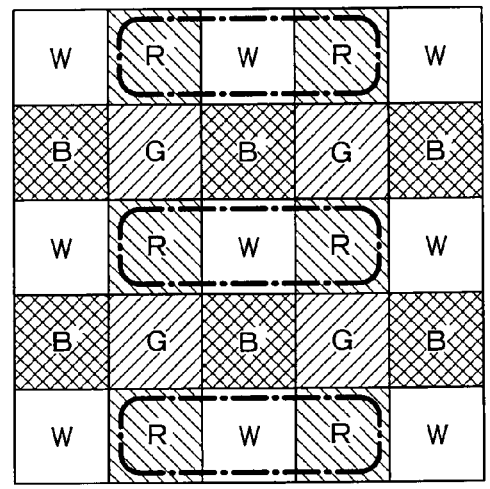
F I G. 15(a)      F I G. 15(b)
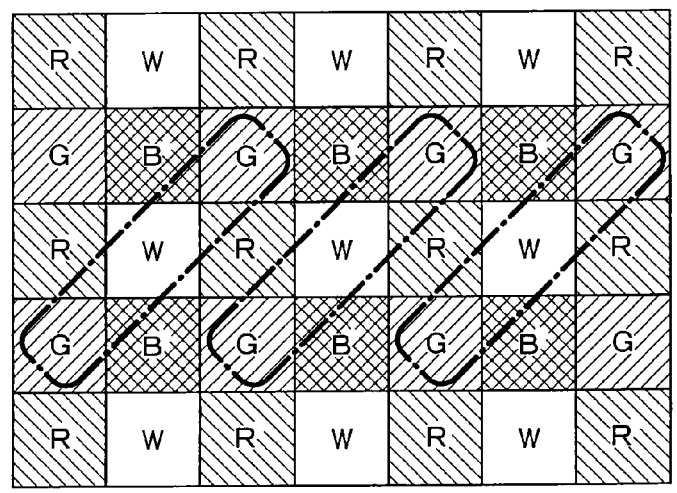
F I G. 15(c)
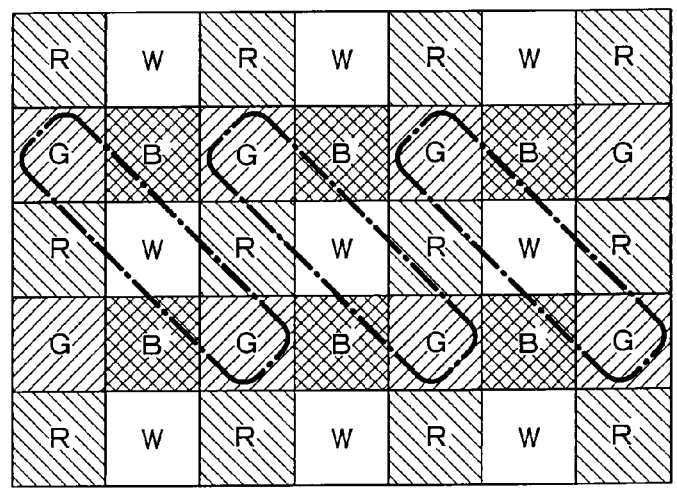
F I G. 15(d)

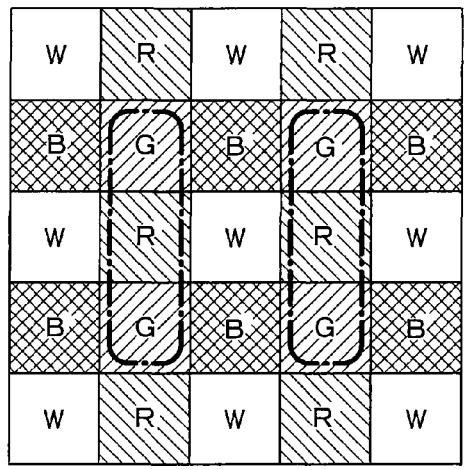
F I G. 17(a)
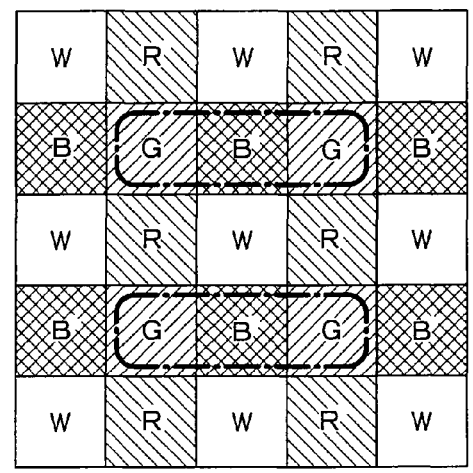
F I G. 17(b)
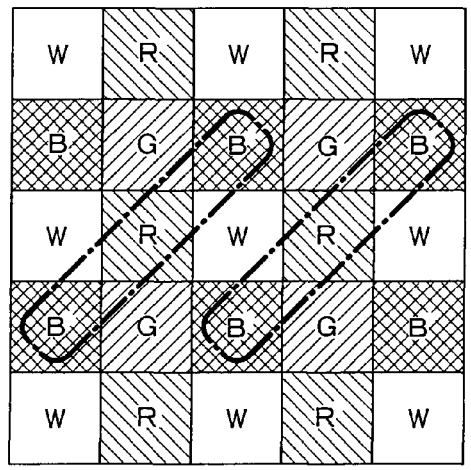
F I G. 17(c)
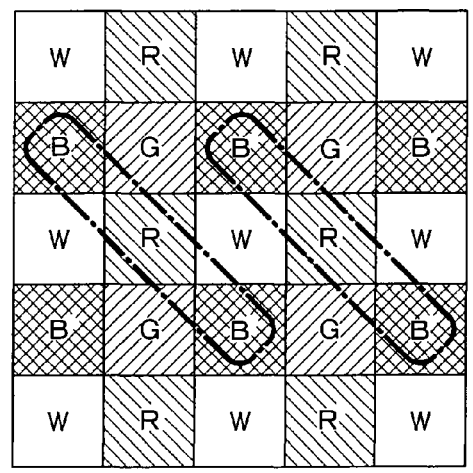
F I G. 17(d)

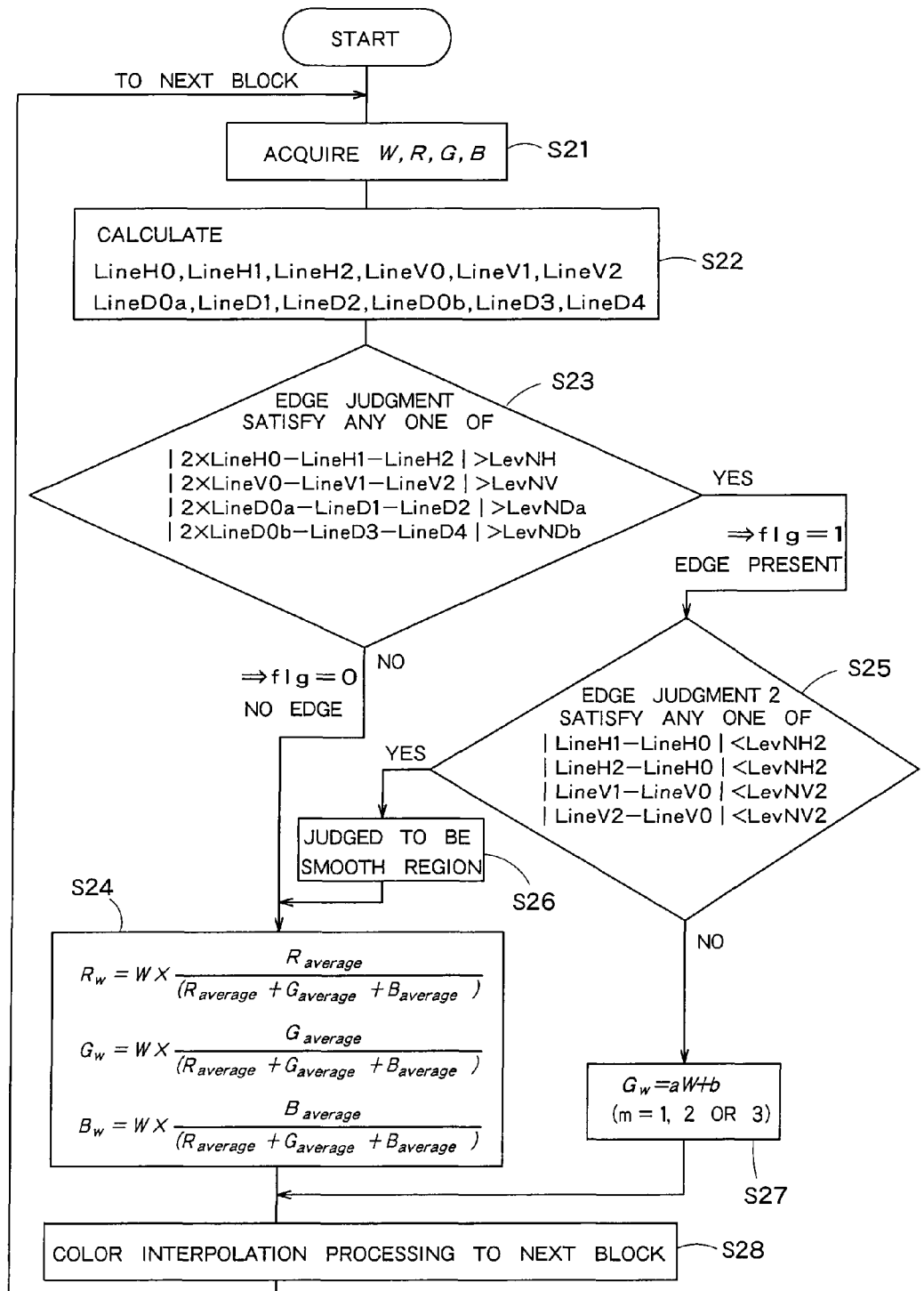
F I G. 18

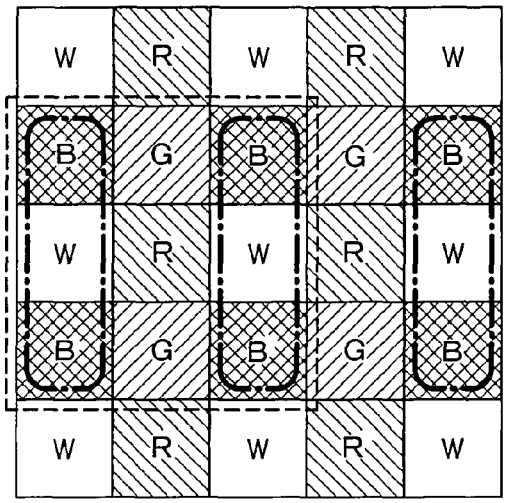
F I G. 19(a)
EDGE JUDGMENT 2 (VERTICAL LINE)
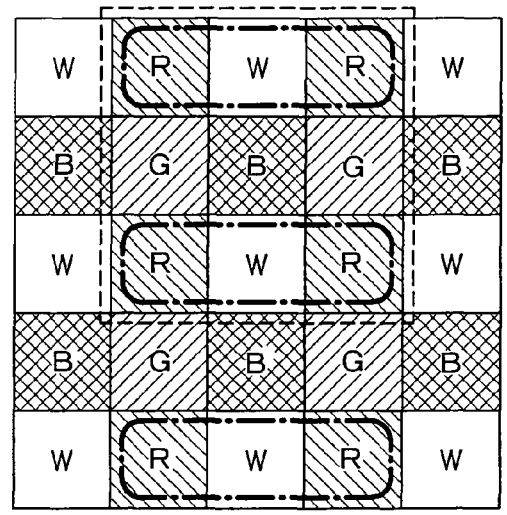
F I G. 19(b)
EDGE JUDGMENT 2 (HORIZONTAL LINE)
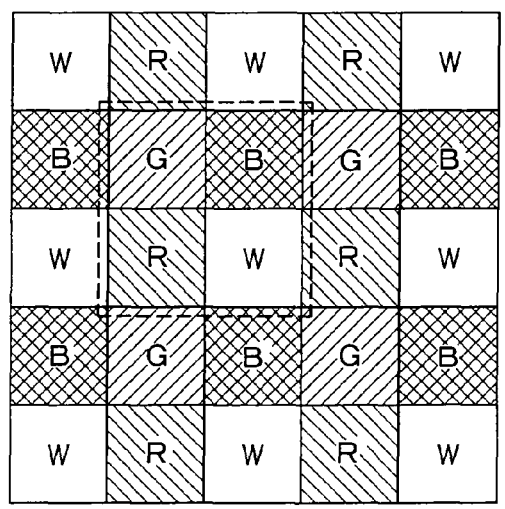
F I G. 19(c)
SPECIFY SMOOTH PART

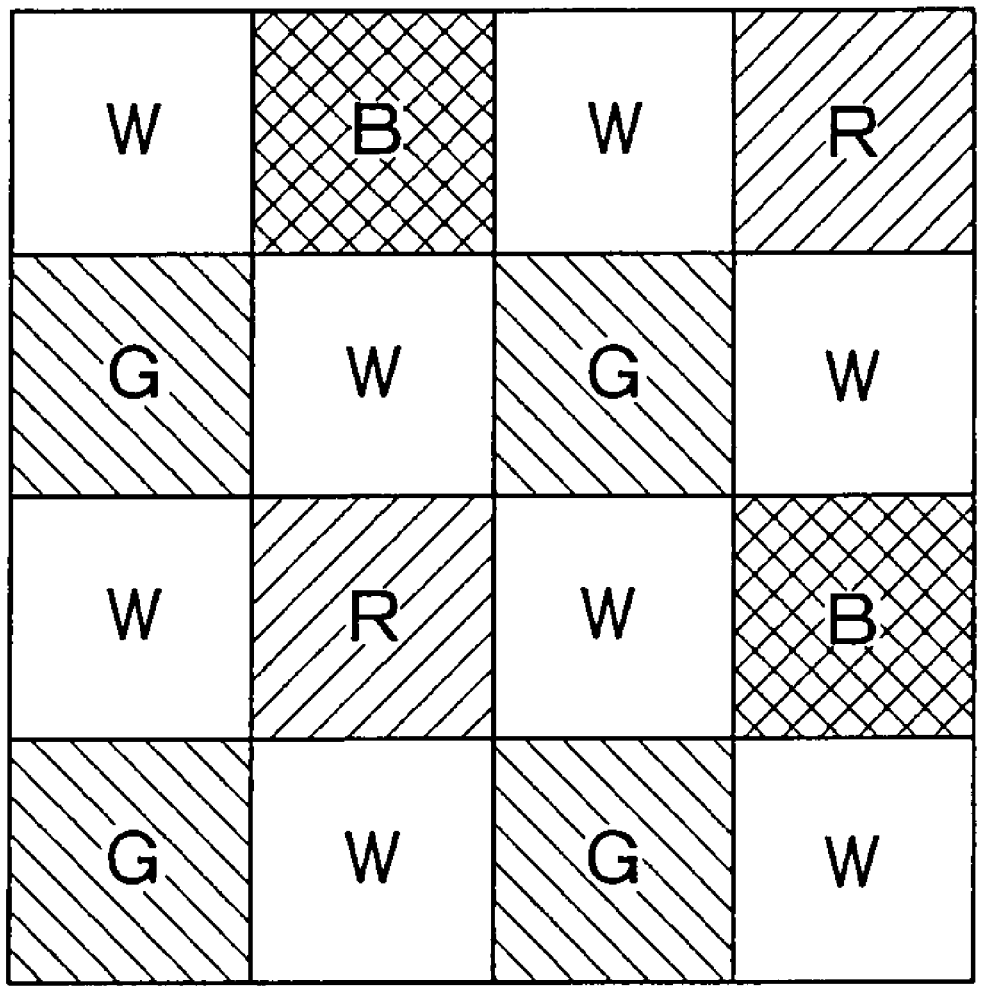
F I G. 20

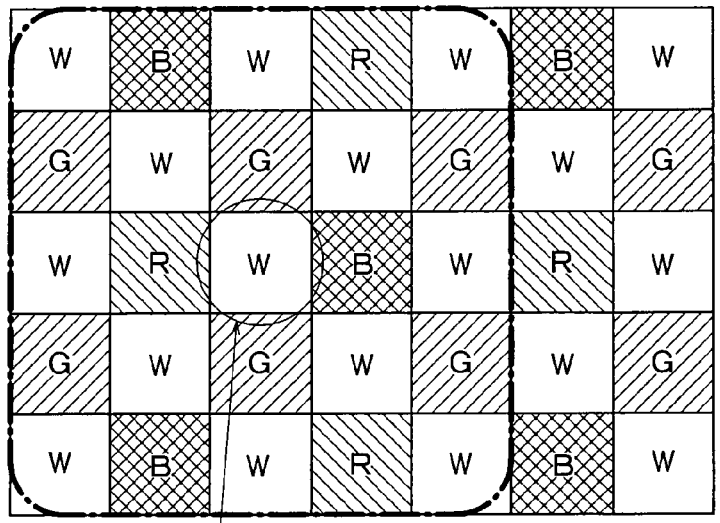
PIXEL TARGETED FOR SIGNAL PROCESSING
F I G. 22
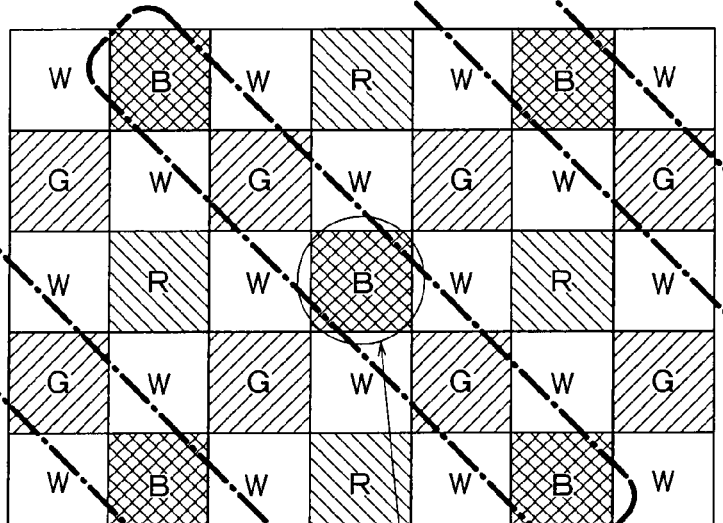
PIXEL TARGETED FOR SIGNAL PROCESSING
F I G. 23

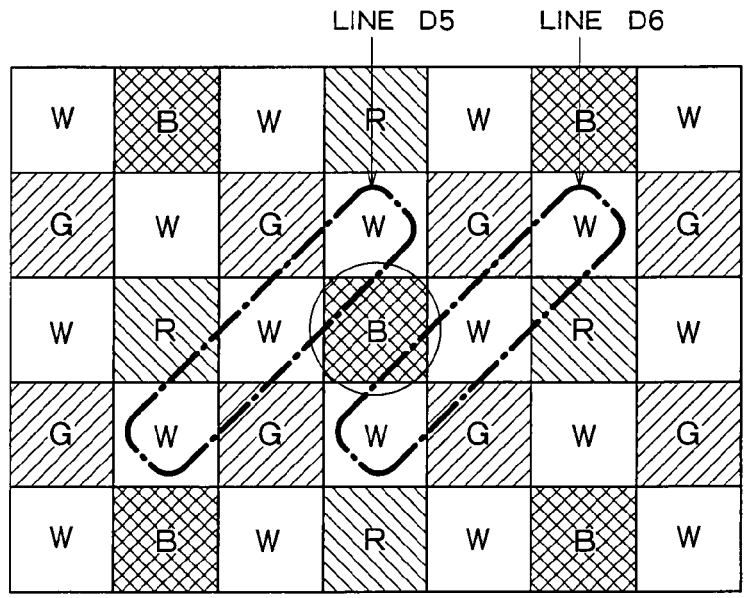
F I G. 24(a)
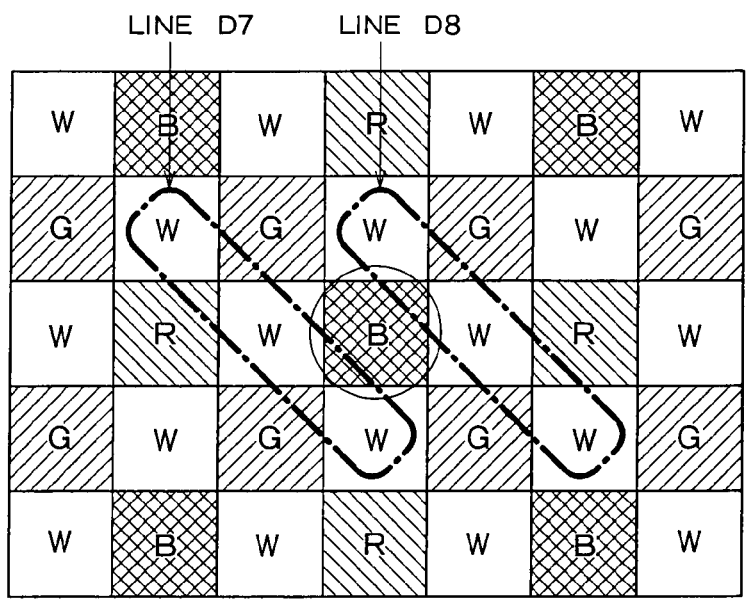
F I G. 24(b)

SOLID-STATE IMAGE SENSING DEVICE

CROSS REFERENCE TO RELATED APPLICATIONS

This application is based upon claims the benefit of priority from the prior Japanese Patent Application No. 2007-150608, filed on Jun. 6, 2006, the entire contents of which are incorporated herein by reference.

BACKGROUND OF THE INVENTION

1. Field of the Invention

The present invention relates to a solid-state image sensing device in which a plurality of pixels having photoelectric conversion elements are arranged in matrix form.

2. Related Art

Recently, CMOS image sensors have been actively developed. In particular, along with the miniaturization in a semiconductor process (reduction in design rules), a single-chip color image sensor has been commercialized in which the number of pixels exceeds five millions at a pixel pitch of, for example, 2.0 µm.

However, the trend of the pixel miniaturization is shifting toward a level with a pixel pitch of 1.7 µm and an aperture area or 1 µm or less. In such a pixel size, the wave nature of incident light is predominant, and the amount of the incident light more rapidly decreases than the reduction ratio of a pixel area due to a diffraction phenomenon. There is thus a need for new measures to increase the SN ratio of an element.

The CMOS image sensor of this kind generally has a color filter of a Bayer arrangement in which there are arranged one red (R) pixel, one blue (B) pixel and diagonal two green (G) pixels in a pixel block composed of two rows and two columns. The reason that two G pixels are provided in the pixel block is that the human visibility to green is high, and the green pixels are used as pixels for acquiring luminance (brightness) information.

Since the image quality changes depending on the arrangement of the color filter as described above, there have been proposed various techniques of elaborating the arrangement of the color filter to improve the image quality (e.g., refer to JP-A 2004-304706 (kokai), JP-A 2003-318375 (kokai) and JP-A 8-23542 (kokai)).

For example, JP-A 2004-304706 (kokai) discloses a technique in which white pixels used as luminance signals are arranged vertically and horizontally around a green pixel in order to ensure the charge quantity of the luminance signal. However, JP-A 2004-304706 (kokai) does not disclose any procedure for processing white pixel data, and gives no consideration to the processing of a pixel signal corresponding to an edge having rapidly changing luminance such as a subject at a high spatial frequency. JP-A 2003-318375 (kokai) and JP-A 8-23542 (kokai) provide no disclosure and suggestion regarding the processing of the edge either.

SUMMARY OF THE INVENTION

The present invention has been made in view of the foregoing problem, and is directed to provide a solid-state image sensing device which has a high SN ratio with respect to a low-illumination subject and which has good color reproducibility and which causes no deterioration of resolution and no generation of aliasing even in the case of a subject having an edge.

According to one aspect of the present invention, a solid-state image sensing device, comprising:

a plurality of pixels formed on a semiconductor substrate in matrix form, each having an photoelectric conversion element;

a read-out circuit configured to read out electric signals obtained by the photoelectric conversion element in the plurality of pixels; and a signal processing unit configured to perform signal processing for the electric signal read out from the read-out circuit, wherein the plurality of pixels includes:

a first pixel configured to lead an incident light of visible light wavelength to the photoelectric conversion element via a transparent film;

a plurality of second pixels, each having a first color filter with a higher transmittance for a first visible light wavelength region than that for the other visible light wavelength region;

a plurality of third pixels, each having a second color filter with a higher transmittance for a second visible light wavelength region different from the first visible light wavelength than that for the other visible light wavelength region; and a plurality of fourth pixels, each having a third color filter with a higher transmittance for a third visible light wavelength region different from the first and second visible light wavelengths than that for the other visible light wavelength region, and the signal processing unit performs the signal processing in units of a pixel block having at least the first to fourth pixels, and includes:

a color acquisition unit configured to acquire a white pixel value corresponding to the first pixel of white color in the pixel block, a first color pixel value corresponding to the second pixel of a first color, a second color pixel value corresponding to the third pixel of a second color and a third color pixel value corresponding to the fourth pixel of a third color;

an edge judging unit configured to judge whether an edge is present around the first pixel which is a target pixel for the signal processing in the pixel block;

a color separation unit configured to calculate color ratios for the first pixel based on the first to third color pixel values around the first pixel, and multiply the calculated color ratios by the white pixel value of the first pixel to color-separate the first pixel and calculate the first to third color pixel values for the first pixel when the edge judgement unit judges that an edge is not present around the target pixel; and a single color pixel calculation unit configured to calculate a single color pixel value by assuming the first pixel as the other single color except white without calculating the color ratios when the edge judgement unit judges that an edge is present around the target pixel.

Furthermore, according to one aspect of the present invention, a solid-state image sensing device, comprising:

a plurality of pixels formed on a semiconductor substrate in matrix form, each having an photoelectric conversion element;

a read-out circuit configured to read out electric signals obtained by the photoelectric conversion element in the plurality of pixels; and a signal processing unit configured to perform signal processing for the electric signal read out from the read-out circuit, wherein the plurality of pixels includes:
a first pixel configured to lead an incident light of visible light wavelength to the photoelectric conversion element via a transparent film;
a plurality of second pixels, each having a first color filter with a higher transmittance for a first visible light wavelength region than that for the other visible light wavelength region;
a plurality of third pixels, each having a second color filter with a higher transmittance for a second visible light wavelength region different from the first visible light wavelength than that for the other visible light wavelength region; and
a plurality of fourth pixels, each having a third color filter with a higher transmittance for a third visible light wavelength region different from the first and second visible light wavelengths than that for the other visible light wavelength region, and
the signal processing unit performs the signal processing in units of a pixel block having at least the first to fourth pixels, and includes:
a color acquisition unit configured to acquire a white pixel value corresponding to the first pixel of white color in the pixel block, a first color pixel value corresponding to the second pixel of a first color, a second color pixel value corresponding to the third pixel of a second color and a third color pixel value corresponding to the fourth pixel of a third color;
an edge judging unit configured to judge whether an edge is present around the third or fourth pixel which is a target pixel for a signal processing in the pixel block; and
a color addition processing unit configured to output the color pixel value of the target pixel without modification when it is judged that no edge is present around the target pixel, and add the third color pixel value to the color pixel value of the target pixel if the target pixel is the third pixel or add the second color pixel value to the color pixel value of the target pixel if the target pixel is the fourth pixel when the target pixel is the fourth pixel when it is judged that not edge is present around the target pixel.

BRIEF DESCRIPTION OF THE DRAWINGS

FIG. 1 is a block diagram showing a schematic configuration of a solid-state image sensing device according to one embodiment of the present invention;

FIG. 2 is a diagram showing one example of a pixel block of two rows and two columns;

FIG. 6(a) is a sectional view schematically showing the sectional structure for three pixels adjacent in a row direction, and FIG. 6(b) is a sectional view in which infrared cut filters 17 are disposed on the color filters;

FIG. 7 is a graph showing the relation between the pass wavelength region and transmittance of each pixel;

FIG. 8 is a diagram showing an example in which a plurality of pixel blocks of two rows and two columns in FIG. 2 are vertically and horizontally arranged;

FIG. 9 is a diagram showing an example in which RGB pixel values $R_W$, $G_W$, $B_W$ are newly generated at the positions of W pixels;

FIG. 10 is a diagram showing one example of a pixel block of five rows and seven columns around a W pixel;

FIG. 11 is a diagram explaining color interpolation processing;

FIG. 12 is a block diagram showing an internal configuration of a signal processing circuit 6 according the present embodiment;

FIG. 14(a) to FIG. 14(d) are diagrams explaining pixel lines used in an edge judgment;

FIG. 15(a) to FIG. 15(d) are diagrams explaining pixel lines composed of pixels of the same kind;

FIG. 17(a) to FIG. 17(d) are diagrams explaining pixel lines used in an edge judgment in the second embodiment;

FIG. 18 is a flowchart showing the processing operation of a signal processing unit 6 according to a third embodiment;

FIG. 19(a) to FIG. 19(c) are diagrams explaining pixel lines used in an edge judgment in the third embodiment;

FIG. 20 is a diagram showing a pixel arrangement used in a fourth embodiment;

FIG. 22 is a diagram showing one example of a pixel block in the fourth embodiment;

FIG. 23 is a diagram showing one example of pixel lines in the fourth embodiment; and FIG. 24(a) and FIG. 24(b) are diagrams showing one example of pixel lines used in an edge judgment in the fourth embodiment.

DETAILED DESCRIPTION OF THE INVENTION

Figure 3:
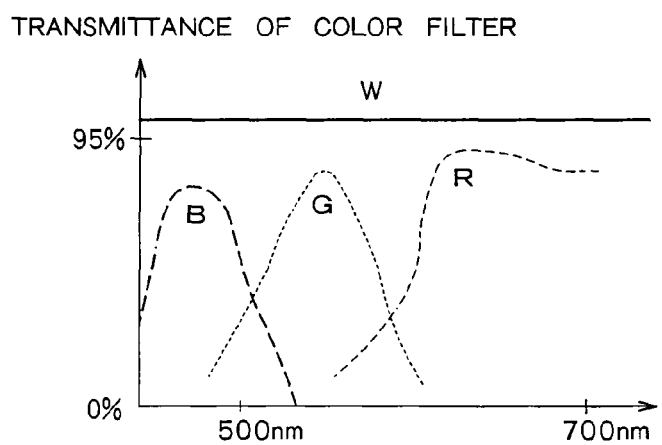
FIG. 3 is a graph showing the transmittance of a color filter.

Hereinafter, embodiments of the present invention will be described with reference to the drawings.

First Embodiment

FIG. 1 is a block diagram showing a schematic configuration of a solid-state image sensing device according to one embodiment of the present invention. The solid-state image sensing device in FIG. 1 has a pixel array 1 in which a plurality of pixels having photoelectric conversion elements are arranged in matrix form, a vertical scanner 2 for sequentially supplying drive voltages to the respective rows in the pixel array 1, a noise subtraction circuit 3 for removing noise contained in an imaging signal photoelectrically converted in the individual pixel, an A/D conversion circuit 4 for the A/D conversion of the imaging signal output from the noise subtraction circuit 3, a horizontal scanner 5 for sequentially selecting imaging data after the A/D conversion row by row and reading the imaging data, and a signal processing unit 6 for performing signal processing described later with respect to the imaging data.

The imaging data is serially input to the signal processing unit 6 column by column for each row in the pixel array 1. The vertical scanner 2, the noise subtraction circuit 3, the A/D conversion circuit 4 and the horizontal scanner 5 configure a read-out circuit. The read-out circuit simultaneously reads signals from a plurality of pixels in one horizontal line, or reads a signal pixel by pixel.

The read-out circuit and the pixel array 1 are formed on the same semiconductor substrate. The signal processing unit 6 may be formed on this semiconductor substrate, or the signal processing unit 6 may be formed on a semiconductor substrate separate from this semiconductor substrate. In this case, the output of the read-out circuit is input to the signal processing unit 6 on the separate semiconductor substrate.

A plurality of pixels in the pixel array 1 are divided into a plurality of pixel blocks on the basis of several adjacently arranged pixels. For example, FIG. 2 is a diagram showing one example of a pixel block of two rows and two columns, wherein a pixel of white W (hereinafter a W pixel) and a pixel of green G (hereinafter a G pixel) are diagonally arranged, and the remaining two pixels are pixels of red R and blue B (hereinafter an R pixel and a B pixel).

The W pixel guides incident light at a visible light wavelength (e.g., 400 nm to 650 nm) to a corresponding photoelectric conversion element via a transparent film. The transparent film is formed of a material transparent to visible light, and shows a high sensitivity in all the visible light regions.

On the other hand, the G pixel is provided with a color filter having a high transmittance for light in a green visible light wavelength region, and the R pixel is provided with a color filter having a high transmittance for light in a red visible light wavelength region, and the B pixel is provided with a color filter having a high transmittance for light in a blue visible light wavelength region.

The reason that the W pixel is provided is that the white pixel transmits light in all the visible light wavelength regions and is therefore suitable to acquire luminance information. The green pixel can also be used to acquire the luminance information, so that the white pixel and the green pixel are diagonally arranged in FIG. 2. This makes it possible to equally detect the luminance information for all the rows and columns and to improve luminance resolution.

Furthermore, the reason that the pixel block in FIG. 2 has RGB pixels in addition to the W pixel is that RGB are primary colors and have better color reproducibility than the pixels of complementary colors (yellow, cyan, magenta), and RGB can also simplify the procedure of signal processing.

Here, the W pixel corresponds to, for example, a first pixel, and the G pixel, the R pixel and the B pixel correspond to, for example, second to forth pixels, respectively.

Figure 4:
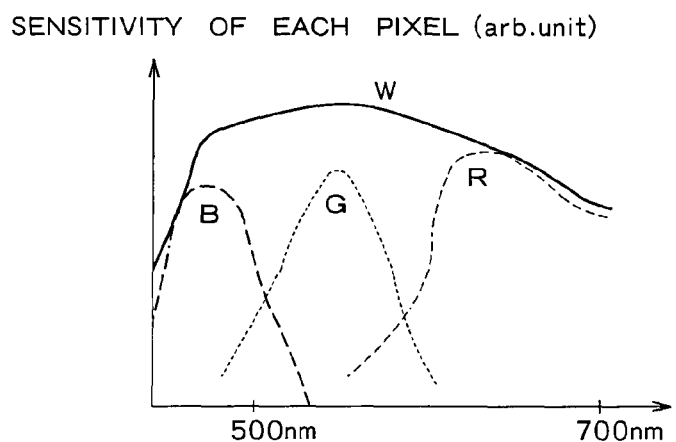
FIG. 4 is a graph showing the sensitivity of each pixel equipped with a color filter of each color.

FIG. 3 is a graph showing the transmittance of the color filter, and FIG. 4 is a graph showing the sensitivity of each pixel equipped with the color filter of each color. As shown in FIG. 3, the filter for white W has a transmittance of 95% or more for the light in all the visible light wavelength regions (about 400 to 700 nm). The color filter for green G has a high transmittance for the light at about 500 to 550 nm. The color filter for red R has a high transmittance for the light in the visible light wavelength region at about 600 to 700 nm. The color filter for blue B has a high transmittance for the light in the visible light wavelength region at about 450 to 490 nm.

As shown in FIG. 4, sensitivity has characteristics similar to the characteristics of the transmittance, so that the pixel of white W has high sensitivity to all the visible light wavelength regions, and has sensitivity about two times as high as the sensitivity of the single pixel of each of RGB.

Furthermore, if the color filter is designed so that the cross point (the transmittance of a point where optical spectrums cross each other) of blue B and green G and the cross point of green G and red R are about 50% of the maximum values, the optical spectrum of green G extracted from white W can be substantially similar in shape to the optical spectrum of single green G when a color signal is extracted from white W as described later. Good color reproducibility can be obtained as long as the cross point is within a value of 40 to 60%, and a practical level of color reproducibility can be obtained within a value of 30 to 70%.

Figure 5:
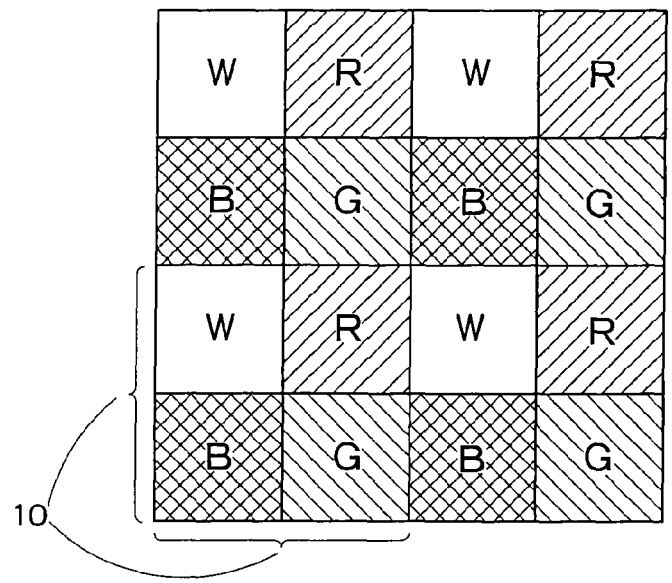
FIG. 5 is a diagram showing an example in which a total of four pixel blocks in FIG. 2 are vertically and horizontally arranged.

FIG. 5 is a diagram showing an example in which a total of four pixel blocks in FIG. 2 are vertically and horizontally arranged. FIG. 6(a) is a sectional view schematically showing the sectional structure for three pixels adjacent in a row direction. As shown in FIG. 6(a), each pixel has a photoelectric conversion element 12 formed on a semiconductor substrate 11, a color filter 14 formed thereon via an interlayer insulating film 13, and a microlens 15 formed thereon. Light shielding films 16 for shielding the light of adjacent pixels are formed inside the interlayer insulating film 13.

As the photoelectric conversion element 12 is sensitive up to a near-infrared wavelength region, and its color reproducibility deteriorates unless near-infrared light (e.g., 650 nm or more) is cut off. For example, when a subject which emits (reflects) pure green light and near-infrared light is imaged, the green light is detected in the G pixel and the near-infrared light is detected in the R pixel, so that the subject can not be detected as pure green (R:G:B)=(0:1:0).

Thus, an infrared cut filter for shielding the light equal to or more than, for example, 650 nm is provided between the solid-state image sensing device and the subject or between the solid-state image sensing device and a lens so that wavelength visible light alone may enter the solid-state image sensing device. Alternatively, as shown in a sectional view in FIG. 6(b), infrared cut filters 17 may be disposed on the color filters. In FIG. 6(b), no infrared cut filter 17 is provided for the white pixel. The reason is that the white pixel is provided to acquire luminance information and can more positively acquire luminance information on a low-illumination side without the infrared cut filter 17.

FIG. 7 is a graph showing the relation between the pass wavelength region and transmittance of each pixel in the case where the infrared cut filters 17 are provided in the respective RGB pixels and no infrared cut filter 17 is provided in the white pixel (hereinafter, W pixel). As shown, the W pixel can absorb light rays up to a wavelength (near-infrared rays of about 1.1 μm) where silicon which is the substrate material of the photoelectric conversion element can perform photoelectric conversion. The W pixel is advantageous particularly in the case of imaging a low-illumination subject, and can also be used as a near-infrared camera.

A signal value W output by the W pixel can not be directly used as an RGB value which is an all-purpose video signal. Therefore, it is necessary to color-separate a white pixel value W of the W pixel into three-color pixel values of RGB. The processing for color separation (hereinafter, color separation processing) is explained below.

FIG. 8 is a diagram showing an example in which a plurality of pixel blocks of two rows and two columns in FIG. 2 are vertically and horizontally arranged. As indicated by thick lines in FIG. 8, a pixel block of three rows and three columns around a W pixel is defined as a basic unit below. FIG. 8 is an example of clarifying the explanation of the color separation processing, and an actual basic unit of the pixel block is not limited to three rows and three columns.

The color separation processing is performed using the RGB pixels around the W pixel in accordance with Equations (1) to (3) below.

$$R_W \leftarrow W \cdot K_1 \quad (1)$$

$$G_W \leftarrow W \cdot K_2 \quad (2)$$

$$B_W \leftarrow W \cdot K_3 \quad (3)$$

Here, $K_1$, $K_2$ and $K_3$ indicate color ratios obtained from the RGB pixels around the target W pixel, and are represented by, for example, Equations (4) to (6) below.

$$K_1 = \frac{R_{average}}{(G_{average} + R_{average} + B_{average})} \quad (4)$$

$$K_2 = \frac{G_{average}}{(G_{average} + R_{average} + B_{average})} \quad (5)$$

$$K_3 = \frac{B_{average}}{(G_{average} + R_{average} + B_{average})} \quad (6)$$

Here, $R_{average}$, $G_{average}$ and $B_{average}$ are the averages of color pixel values RGB of a plurality of pixels around the target W pixel, and are, for example, an average color pixel value for two red pixels present in the pixel block, an average color pixel value for four green pixels, and an average color pixel value for two blue pixels.

As shown in FIG. 8, the color ratios $K_1$, $K_2$ and $K_3$ in the pixel block of three rows and three columns around the W pixel are calculated, and multiplied by the luminance value of the W pixel itself (white pixel value W). In this manner, the W pixel is color-separated without deteriorating the luminance resolution, and the RGB pixel values $R_W$, $G_W$, $B_W$ are newly generated at the position of the W pixel, as shown in FIG. 9.

In the color separation processing, the color pixel value of the adjacent row is referred to, so that a calculation crossing over the row has to be performed. Thus, the color pixel values for two rows are temporarily stored in a line memory, and at the point where the final row in the pixel block is read, the color pixel values for the remaining two rows stored in the line memory are read to perform the calculations of Equations (1) to (3) mentioned above.

Here, if the color pixel values in the pixel block are, for example, W=200 and ($R_{average}$, $G_{average}$, $B_{average}$)=(80, 100, 70), then ($R_W$, $G_W$, $B_W$)=(64, 80, 56) in accordance with Equations (1) to (6).

If the white pixel value W is converted into the color pixel values $R_W$, $G_W$, $B_W$ in this manner, it is (64+80+56)/(80+100+70)=4/5 times as high as the average color pixel values $R_{average}$, $G_{average}$, $B_{average}$. Thus, a value by which the right side of each of (1) to (3) is multiplied with the reciprocal 5/4 as a constant may be the final the color pixel value $R_W$, $G_W$, $B_W$.

The color conversion data $R_W$, $G_W$, $B_W$ can only be obtained by the multiplication and division using the white pixel value W originally having a high SN ratio and the color pixel value having an SN ratio improved by averaging, and the SN ratio of the generated color pixel value is higher than that of the single color pixel value of R, G, B.

In addition, as described above, the pixel block is not limited to three rows and three columns. For example, FIG. 10 is a diagram showing one example of a pixel block of five rows and seven columns around a W pixel. The capacity of the above-mentioned line memory used to perform the color separation processing depends on the number of rows in the pixel block, and the capacity of the line memory increases with the increase in the number of rows. Therefore, it is not desirable to extremely increase the number of rows in the pixel block.

After the color separation processing has been finished, color interpolation processing is performed. In this color interpolation processing, for example, an average value R' of all the R pixels and $R_W$ pixels in the pixel block is calculated, as shown in FIG. 11. In the same manner, an average value G' of all the G pixels and $G_W$ pixels in the pixel block is calculated, and an average value B' of all the B pixels and $B_W$ pixels in the pixel block is calculated. As shown in FIG. 11, the calculated pixel average values R', G', B' are regarded as color pixel values of the central pixels (pixels targeted for signal processing) of the pixel blocks.

In this color interpolation processing, the pixel arrangement of the pixel block including the W pixel is treated in the same manner as the Bayer arrangement, and the color pixel values of the pixels around the pixel targeted for signal processing are used to correct the color pixel value of the pixel targeted for signal processing. Thus, three-color pixel values RGB and color-separated pixel values $R_W$, $G_W$, $B_W$ in the pixel block of three rows and three columns around every pixel are averaged to determine final color pixel values R', G', B' for all the pixels.

The processing described above is repeated such that the color pixel values R', G', B' of the three colors are generated for all the pixel positions. Of these color pixel values, the color pixel values R', B' are obtained by the color interpolation based on the R pixel values and B pixel values of the number of pixels twice as large as that of the Bayer arrangement, and the SN ratio is improved to about two times as high as before.

The color separation processing described above is performed on the assumption that hues (color ratios K1 to K3) in the pixel block of three rows and three columns are uniform. However, this assumption is not satisfied in the case of imaging a subject at a spatial frequency higher than three rows and three columns, that is, in the case where an edge is contained in the pixel block.

For example, in the case of imaging a subject in which the row including the W pixel in the center in FIG. 8 corresponds to a pure white line having a high luminance and the luminance of regions other than this row is zero, output values of the G, R pixels are significantly low while output values of the W, B pixels are significantly high if the color separation processing is simply honestly performed in accordance with Equations (1) to (6) above. In this case, K3 (the ratio of blue) alone of K1 to K3 takes a large value, and K1, K2 take values close to zero.

That is, in the color separation processing, aliasing of a color different from the actual color of the subject is calculated for the imaging data for a subject at a spatial frequency higher than three rows and three columns.

In order to solve this problem, there is provided an edge judgment unit for detecting a pixel region at a high spatial frequency in the present embodiment.

FIG. 12 is a block diagram showing an internal configuration of a signal processing circuit 6 according the present embodiment. As shown, the signal processing circuit 6 has a color separation processing unit 11 for performing the color separation processing in accordance with Equations (1) to (6) mentioned above, and a color interpolation processing unit 12 for averaging the color pixel values after the color separation to determine a final color pixel value, in addition to which the signal processing circuit 6 also has an edge judgment unit 20 for judging whether a pixel is at a high spatial frequency, that is, whether a pixel region has an edge. The color separation processing unit 11, the color interpolation processing unit 12 and the edge judgment unit 20 perform processing on the basis of a pixel block composed of a plurality of pixels, and each of the units is provided with a memory for storing the color pixel value for one pixel block.

In the signal processing circuit 6 of the present embodiment, the contents of processing in the color separation processing unit 11 are changed depending on whether or not en edge is judged to be present by the edge judgment unit 20.

Figure 13:
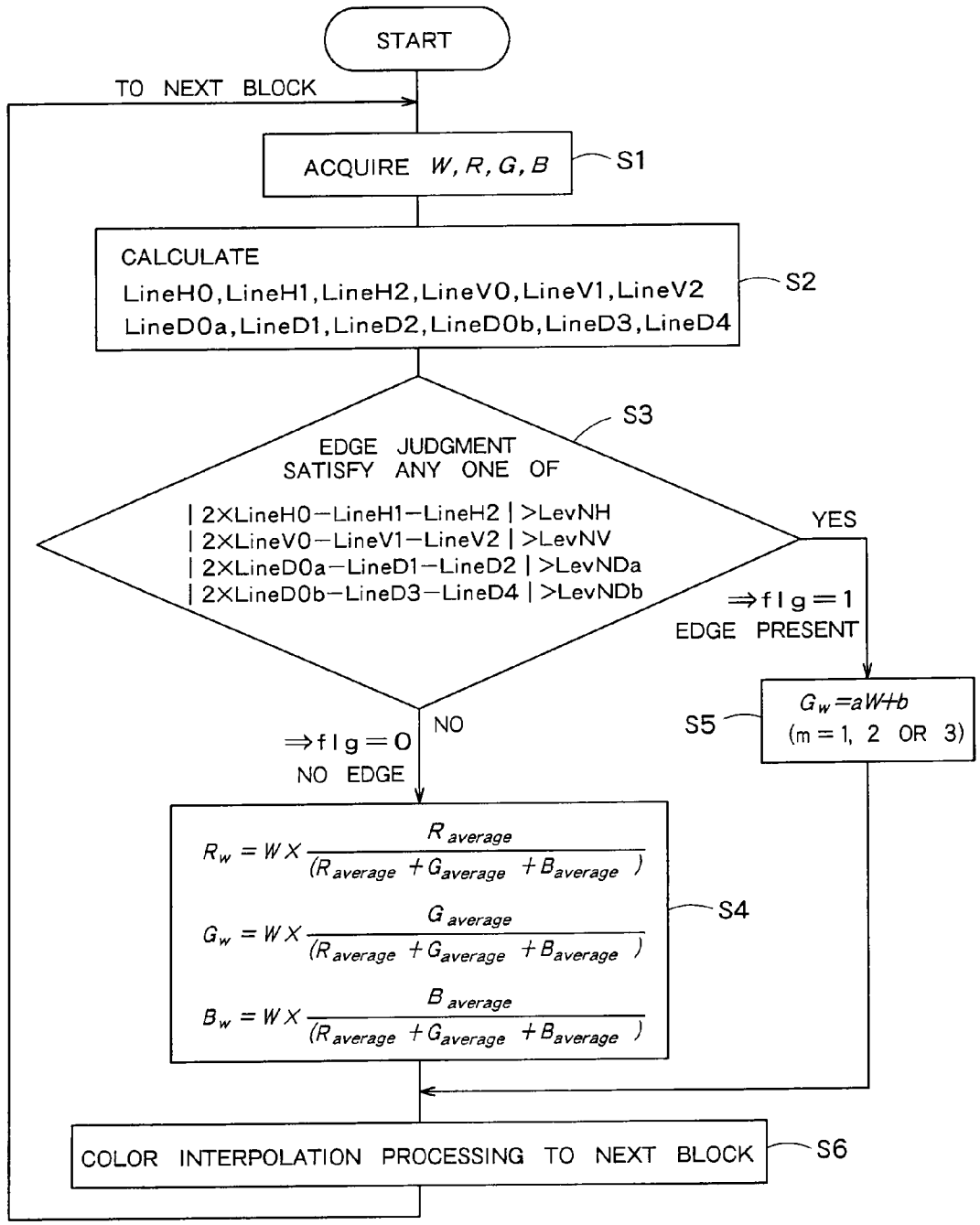
FIG. 13 is a flowchart showing the processing operation of a signal processing unit configured as in FIG. 12 in a first embodiment.

FIG. 13 is a flowchart showing the processing operation of the signal processing unit configured as in FIG. 12 in the first embodiment. FIG. 14(a) to FIG. 14(d) are diagrams explaining pixel lines used in an edge judgment.

First, as indicated by thick lines in FIG. 14(a), a color pixel value C=(C1, C2, C3) of RGB and a white pixel value W in each pixel block are acquired on the basis of a pixel block of three rows and five columns having a W pixel located in its center (step S1). The W pixel in the center of the pixel block is the pixel targeted for signal processing.

Then, as shown in FIG. 14(a), a total LineV0 of the color pixel values of three pixels in a vertical line including the W pixel in the center, and a total LineV1, LineV2 of the color pixel values of three pixels in each of both vertical lines adjacent to the above vertical line are detected. Likewise, as shown in FIG. 14(b), a total LineH0 of the color pixel values of three pixels in a horizontal line including the W pixel in the center, and a total LineH1, LineH2 of the color pixel values of three pixels in each of both horizontal lines adjacent to the above horizontal line are detected. Likewise, as shown in FIG. 14(c), a total LineD0a of the color pixel values of three pixels in a rightwardly diagonal line including the W pixel in the center, and a total LineD1, LineD2 of the color pixel values of three pixels in each of both rightwardly diagonal lines adjacent to the above rightwardly diagonal line are detected. Likewise, as shown in FIG. 14(d), a total LineD0b of the color pixel values of three pixels in a leftwardly diagonal line including the W pixel in the center, and a total LineD3, LineD4 of the color pixel values of three pixels in each of both leftwardly diagonal lines adjacent to the above leftwardly diagonal line are detected (step S2).

Then, the edge judgment unit 20 judges whether the vertical lines, horizontal lines, rightwardly diagonal lines and leftwardly diagonal lines satisfy the conditions of Equations (7) to (10) below (step S3).

$$|2\times LineV0-(LineV1+LineV2)|>LevNV \quad (7)$$

$$|2\times LineH0-(LineH1+LineH2)|>LevNH \quad (8)$$

$$|2\times LineD0a-(LineD1+LineD2)|>LevNDa \quad (9)$$

$$|2\times LineD0b-(LineD3+LineD4)|>LevNDb \quad (10)$$

Here, LevNV is a threshold value for detecting a vertical edge, LevNH is a threshold value for detecting a horizontal edge, LevNDa is a threshold value for detecting a rightwardly diagonal edge, and LevNDb is a threshold value for detecting a leftwardly diagonal edge.

For example, when Equation (7) is true, it is judged that an edge of a vertical line is present, and a flag flg=1 is set. For example, if LineV0=100, LineV1=100, LineV2=20, and LevNV=50, then Equation (7) is true, and an edge is detected, resulting in a flag flg=1. For the edges of the horizontal line, rightwardly diagonal line and leftwardly diagonal line, it is judged that edges are present when Equations (8) to (10) are true, and a flag flg=1 is set.

In step S3, if at least one of the conditions in Equations (7) to (10) above is satisfied, it is judged that an edge is present, and the processing in step S5 described later is performed. If all the conditions in Equations (7) to (10) above are not satisfied, it is judged that no edge is present, and the processing in step S4 described later is performed.

Equation (7) above corresponds to a vertical line edge judgment unit, Equation (8) above corresponds to a horizontal line edge judgment unit, Equation (9) above corresponds to a rightwardly diagonal line edge judgment unit, and Equation (10) above corresponds to a leftwardly diagonal line edge judgment unit.

The edge detection can be carried out by Equations (7) to (10) above. Among the three lines targeted for comparison, the central line and the lines on both sides thereof are different in the kind of pixels. In the case of, for example, the vertical line, the central vertical line is composed of the B pixels and the W pixel, while the vertical lines on both sides of the central vertical line are composed of the G pixels and the R pixels, as shown in FIG. 14(a).

When the comparison targets differ from each other in the kind of pixels as described above, it might not be possible to perform a correct edge detection. For example, when a subject of single blue is imaged in the pixel block in FIG. 14(a), the central vertical line alone outputs a high color pixel value even if the original subject has no edge, so that Equation (7) is true, and the central vertical line is recognized as an edge.

Thus, as shown in FIG. 15(a) to FIG. 15(d), the lines composed of pixels of the same kind may be compared with each other. In the case of FIG. 15(a) to FIG. 15(d), three lines in which one pixel row is interposed between two lines are selected instead of adjacent three lines, but the arrangement and kind of pixels in the three lines targeted for comparison are the same. Therefore, the accuracy of the edge detection is improved.

When it is judged that no edge is present as a result of the edge judgment processing in step S3, the color separation processing unit 11 performs the color separation processing on the W pixel in the center of the pixel block in accordance with Equations (1) to (6) mentioned above, and converts a W pixel value into color pixel values $R_W$, $G_W$, $B_W$ of RGB (step S4).

On the other hand, when it is judged that an edge is present as a result of the edge judgment processing in step S3, it is not possible to refer to the surrounding pixels for correct color ratios, so that the W pixel is treated as a G pixel in accordance with Equation (11) below (a single color pixel calculation unit, step S5). The reason that the W pixel is treated as a G pixel is that the G pixel is used to obtain luminance information, and the generation of aliasing is inhibited by not treating the W pixel as an R pixel or B pixel.

$$G_W=aW+b \quad (11) \text{ (a, b are constant numbers)}$$

As the white pixel value originally has a value twice as high as a green pixel value to subjects having the same luminance, a signal value is corrected by setting, for example, a=0.5 and b=0. In this case, if the white pixel value is, for example, 150, then $G_W$=75. The value b is set when, for example, the W pixel and the G pixel differ in dark signal.

The single color pixel calculation unit for performing the processing in step S5 may be provided in the color separation processing unit 11 in FIG. 12 or may be provided separately from the color separation processing unit 11.

Owing to the operation described above, a signal matrix is almost like the Bayer arrangement in the case where an edge is present, so that the generation of aliasing is inhibited.

When the processing in step S4 or S5 in FIG. 13 is finished, the color interpolation processing unit 12 performs the color interpolation processing (step S6). In this color interpolation processing, as described with FIG. 11, the average of the color pixel values of all the G pixels and the average of the color pixel values of all the B pixels in the pixel block are calculated, and the averaged color pixel value of the G pixels and the B pixels is used as the color pixel value of the W pixel in the center of the pixel block.

Thus, in the first embodiment, for each pixel block including the W pixel in the center, an edge judgment is carried out to detect whether a subject at a high spatial frequency is present around the W pixel, that is, whether a pixel region has an edge. The W pixel in the center is color-separated into three-color pixel values when there is no edge, while the central W pixel is treated as a G pixel when there is an edge. This eliminates such a problem that aliasing is generated due to a subject at a high spatial frequency.

Second Embodiment

A second embodiment is different from the first embodiment in the kind of pixel line used for an edge judgment.

In the example described in the first embodiment, as shown in FIG. 14(a) to FIG. 14(d) or FIG. 15(a) to FIG. 15(d), three lines are set as comparison targets for edge detection in a pixel block, and the central line among these lines includes a W pixel targeted for signal processing located in the center of the pixel block.

The pixel line targeted for comparison does not necessarily have to include the W pixel targeted for signal processing located in the center of the pixel block. Thus, in the second embodiment described below, the edge judgment is carried out using two lines adjacent to the central W pixel. Moreover, the second embodiment is characterized in that the kind of two pixel lines targeted for comparison is the same.

Figure 16:
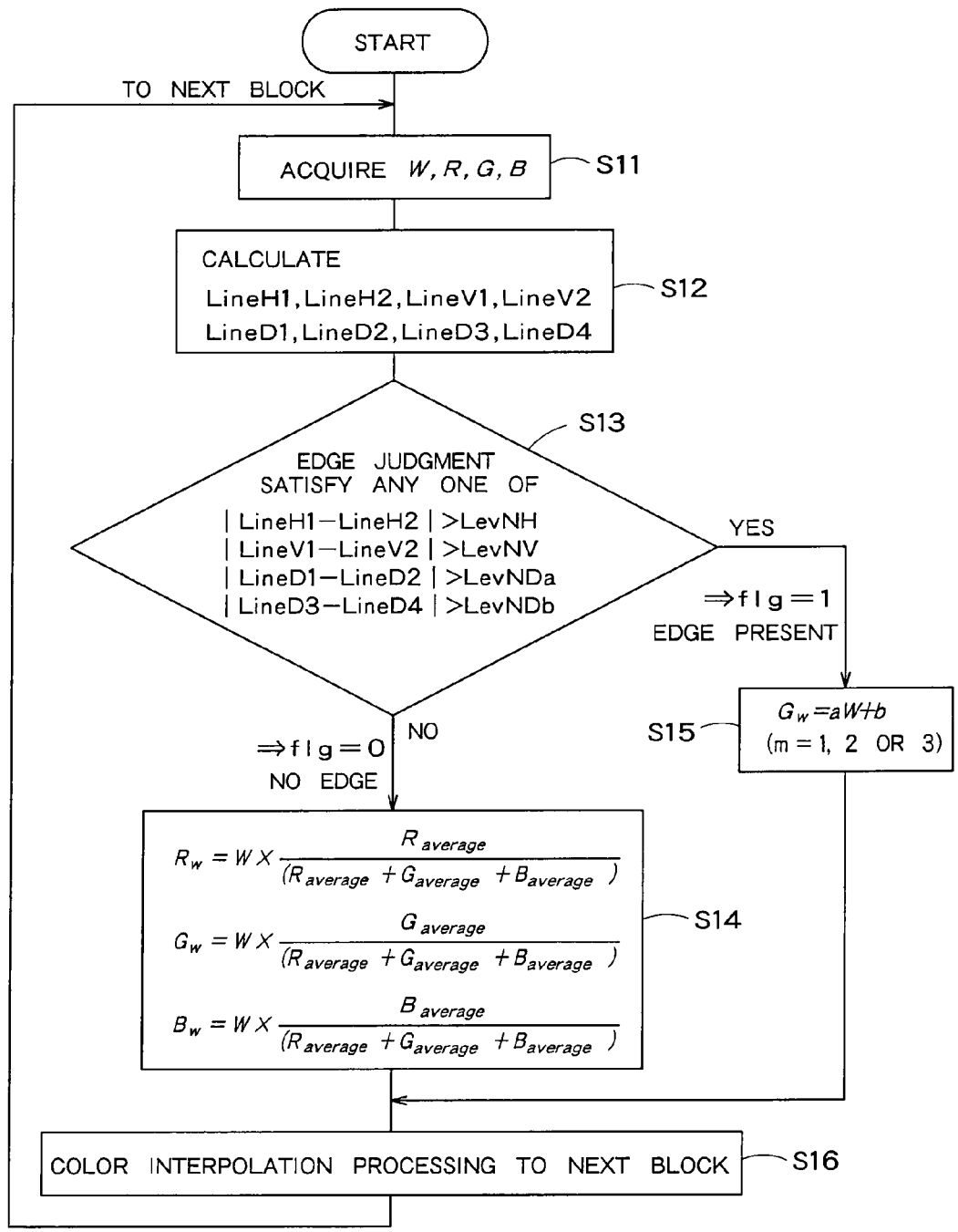
FIG. 16 is a flowchart showing a processing operation of a signal processing unit 6 configured as in FIG. 12 in a second embodiment.

FIG. 16 is a flowchart showing a processing operation of a signal processing unit 6 configured as in FIG. 12 in the second embodiment. FIG. 17(a) to FIG. 17(d) are diagrams explaining pixel lines used in an edge judgment.

First, as in step S1 in FIG. 13, a color pixel value of RGB and a white pixel value W in each pixel block are acquired (step S11). Then, the total of the color pixel values of two lines for an edge judgment is detected (step S12). More specifically, as shown in FIG. 17(a), total values LineV1, LineV2 of the color pixel values of three pixels in each of both vertical lines across the W pixel are detected as shown in FIG. 17(a), and total values LineH1, LineH2 of the color pixel values of three pixels in each of both horizontal lines across the W pixel are detected as shown in FIG. 17(b). Likewise, total values LineD1, LineD2 of the color pixel values of three pixels in each of both rightwardly diagonal lines across the W pixel are detected as shown in FIG. 17(c), and total values LineD3, LineD4 of the color pixel values of three pixels in each of both leftwardly diagonal lines across the W pixel are detected as shown in FIG. 17(d).

Then, an edge detection unit judges whether the vertical lines, horizontal lines, rightwardly diagonal lines and leftwardly diagonal lines satisfy the conditions of Equations (12) to (15) below (step S13).

$$|LineV1-LineV2|>LevNV \qquad (12)$$

$$|LineH1-LineH2|>LevNH \qquad (13)$$

$$|LineD1-LineD2|>LevNDa \qquad (14)$$

$$|LineD3-LineD4|>LevNDb \qquad (15)$$

In step S13, if at least one of the conditions in Equations (12) to (15) above is satisfied, it is judged that en edge is present, and the central W pixel is treated as a G pixel on the basis of Equation (11) above (step S15). On the other hand, if all the conditions in Equations (12) to (15) above are not satisfied, it is judged that no edge is present, and color separation processing is performed in accordance with Equations (1) to (6) mentioned above to convert a white pixel value into RGB color pixel values (step S14).

When the processing in step S14 or S15 is finished, color interpolation processing similar to that in step S6 of FIG. 13 is performed (step S16).

As described above, in the second embodiment, the edge judgment is carried out by the comparison of the color pixel values of two lines in the pixel block, such that the edge judgment can be achieved in a smaller amount of processing than the comparison of the color pixel values of three lines. Moreover, as the kind of pixels constituting the two pixel lines targeted for comparison is the same, there is no risk of erroneously judging the pixel line as an edge.

Third Embodiment

In a third embodiment, a region having no edge is detected around a target W pixel, and color separation processing is performed in this region.

FIG. 18 is a flowchart showing the processing operation of a signal processing unit 6 according to the third embodiment, and FIG. 19(a) to FIG. 19(c) are diagrams explaining pixel lines used in an edge judgment.

First, a color pixel value in a pixel block including a W pixel in the center is acquired (step S21). Then, the central W pixel is used as a pixel targeted for signal processing to calculate the total of the color pixel values of a vertical line LineV0 including the W pixel, the total of the color pixel values of each of two vertical lines LineV1, LineV2 located on both sides of the vertical line LineV0 across one pixel, the total of the color pixel values of a horizontal line LineH0 including the W pixel, the total of the color pixel values of each of two horizontal lines LineH1, LineH2 located on both sides of the horizontal line LineH0 across one pixel, the total of the color pixel values of a rightwardly diagonal line LineD0a including the W pixel, the total of the color pixel values of each of two rightwardly diagonal lines LineD1, LineD2 located on both sides of the rightwardly diagonal line LineD0a across one pixel, the total of the color pixel values of a leftwardly diagonal line LineD0B including the W pixel, and the total of the color pixel values of each of two leftwardly diagonal lines LineD3, LineD4 located on both sides of the leftwardly diagonal line LineD0B across one pixel (step S22).

Then, an edge judgment unit 20 judges whether the vertical lines, horizontal lines, rightwardly diagonal lines and leftwardly diagonal lines satisfy the conditions of Equations (7) to (10) above (step S23). If all the four conditions are not satisfied, it is judged that no edge is present, and the W pixel targeted for signal processing is color-separated into RGB pixels in accordance with Equations (1) to (6) (step S24).

On the other hand, if at least one of the four conditions in step S23 is satisfied, the edge judgment unit 20 judges whether at least one of the conditions in Equations (16) to (19) below is satisfied (step S25). Equations (16), (17) are conditional expressions for judging whether the difference between the total of the color pixel values of the vertical lines at the ends and the total of the color pixel values of the central vertical line is less than a predetermined threshold value LevNH2. Equations (18), (19) are conditional expressions for judging whether the difference between the total of the color pixel values of the horizontal lines at the ends and the total of the color pixel values of the central horizontal line is less than the predetermined threshold value LevNH2.

$$|LineH1-LineH0|<LevNH2 \qquad (16)$$

$$|LineH2-LineH0|<LevNH2 \qquad (17)$$

$$|LineV1-LineV0|<LevNV2 \qquad (18)$$

$$|LineV2-LineV0|<LevNV2 \qquad (19)$$

The processing in step S25 is performed to detect a smooth region having no edge around the W pixel targeted for signal processing. For example, when LineV1=100, LineV0=90, LineV2=20 and LevNV2=30 as a result of comparing the vertical lines, a pixel region of three rows and three columns enclosed by a dashed line in FIG. 19(a) is judged to be a smooth region having no edge. Likewise, as a result of comparing the horizontal lines, a pixel region of three rows and three columns enclosed by a dashed line in FIG. 19(b) is judged to be a smooth region having no edge.

In this case, a pixel region of two rows and two columns in FIG. 19(c) which is a common part of the dashed regions in FIG. 19(a) and FIG. 19(b) is finally judged to be a smooth region having no edge (step S26). Then, color separation processing is performed on this smooth region in step S24.

On the other hand, when all the judgments in Equations (16) to (19) above are denied, it is judged that no smooth region is present and normal color separation processing is impossible, so that the W pixel targeted for signal processing is treated as a G pixel on the basis of Equation (11) above (step S27).

As described above, in the third embodiment, when an edge is present around the W pixel targeted for signal processing, whether any smooth region is present around the W pixel is judged. When a smooth region is present, the color separation processing of the W pixel is performed in this smooth region. Consequently, even when there is an edge, maximally reliable color separation processing can be performed, and an RGB image with good color reproducibility can be obtained.

Fourth Embodiment

In a fourth embodiment, a pixel arrangement different from those in the first to third embodiments is employed, and the kind of pixel row used in an edge judgment is also changed.

FIG. 20 is a diagram showing the pixel arrangement used in the fourth embodiment. In the pixel arrangement in FIG. 20, W pixels are arranged in a staggered form, and account for 50% of the total number of pixels. G, R, B pixels are arranged at rates of 25%, 12.5% and 12.5% among the W pixels. The reason that the ratios of the R and B pixels are low is that the human visibility to green light is high and color information is not so demanded for red and blue as for green.

Figure 21:
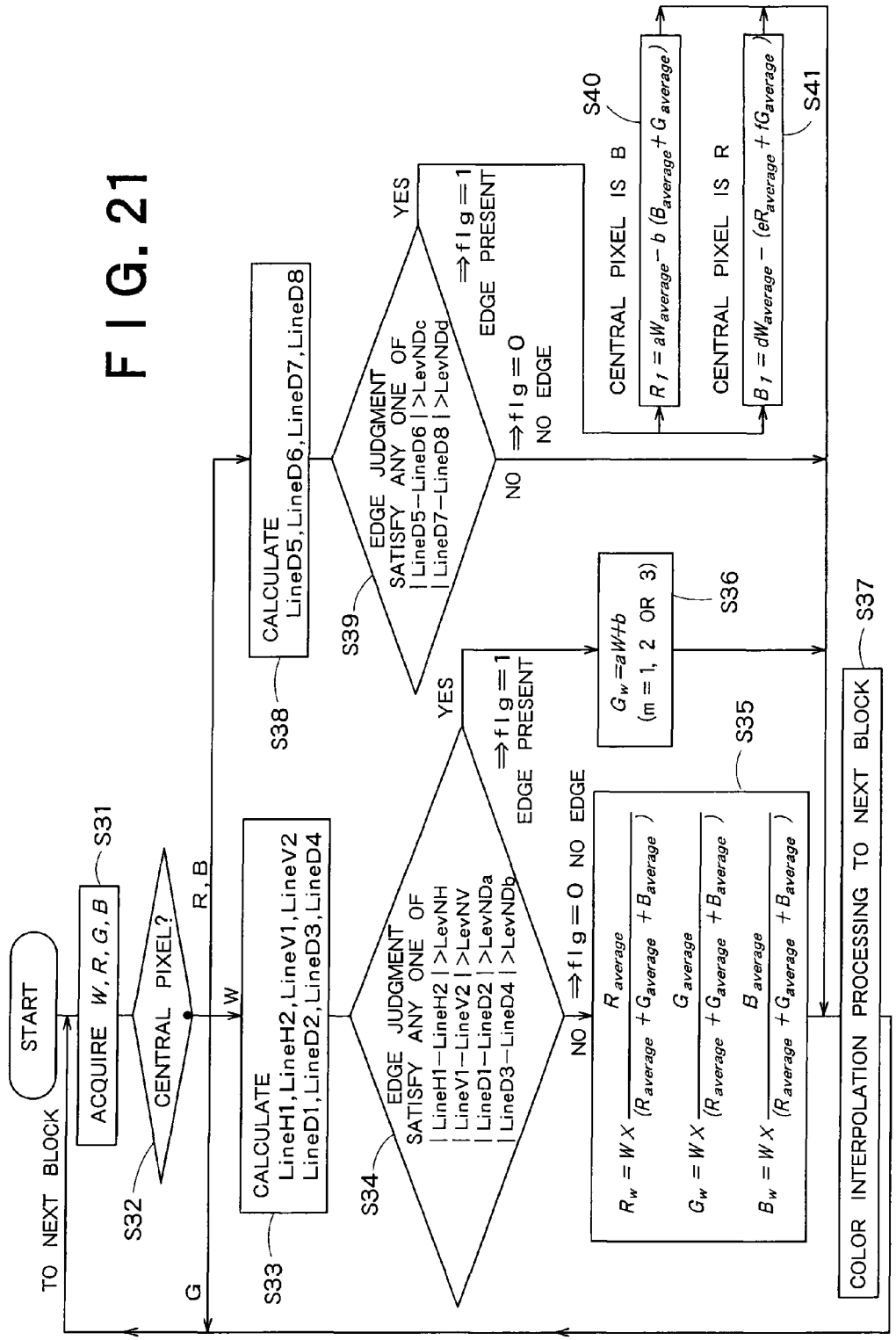
FIG. 21 is a flowchart showing the processing procedure of a signal processing unit 6 according to the fourth embodiment.

FIG. 21 is a flowchart showing the processing procedure of a signal processing unit 6 according to the fourth embodiment. While the signal processing target is limited to the W pixel in the first to third embodiments, not only the W pixel but also the RGB pixels are targeted for signal processing in the present embodiment. Thus, after a color pixel value has been acquired (step S31), whether the pixel (central pixel) targeted for signal processing is a W pixel is judged (step S32).

If the signal processing target is the W pixel, processing similar to that in FIG. 13 is performed (steps S33 to S37). In this case, the processing in steps S33 to S37 may be performed using the color pixel value of a pixel block of three rows and three columns around the W pixel, or using the color pixel value of a range wider than the pixel block of three rows and three columns, such as a pixel block of five rows and five columns or of five rows and seven columns as shown in FIG. 22.

A larger pixel block has a larger number of reference pixels and holds down random noise contained in the average of the color pixel values of the RGB pixels, but increases the amount of signal processing. Therefore, the size of the pixel block can be selected in consideration of the trade-off between noise reduction and the increase of the signal processing amount.

When there is no edge, the W pixel can be color-separated into RGB pixels by the above-mentioned processing in steps S33 to S37. When there is an edge, the W pixel can be replaced with the G pixel.

On the other hand, when the signal processing target is not the W pixel but the R pixel or B pixel, the processing in steps S38 to S41 described below is performed. In the case of the pixel arrangement in FIG. 20, the number of the R pixels and B pixels present is only half the number of the G pixels. Therefore, as shown in FIG. 23, no R pixels are present in a rightwardly diagonal line including the B pixel targeted for signal processing. If a black and white striped subject having an edge along the rightwardly diagonal line is imaged, the color pixel values of the G pixels and B pixels are extremely high, and the color pixel values of the R pixels that should essentially be detected are not output, which causes the generation of strong aliasing. The same applies to the case where a subject having an edge along the leftwardly diagonal line is imaged. A similar problem also arises when the pixel targeted for signal processing is an R pixel, in which case the color pixel values of the B pixels that should essentially be detected are not output.

Thus, in steps S38 to S41 in FIG. 21, interpolation processing is performed in which the R pixel is allocated to the position of the B pixel targeted for signal processing and the B pixel is allocated to the position of the R pixel targeted for signal processing.

First, as shown in FIGS. 24(a) and 24(b), total values LineD5, LineD6 of the color pixel values of each of both rightwardly diagonal lines adjacent to the B pixel targeted for signal processing, and total values LineD7, LineD8 of the color pixel values of each of both leftwardly diagonal lines adjacent to the B pixel targeted for signal processing are detected. Whether at least one of the conditions in Equations (20) to (21) below is satisfied is then judged. A flag "flg" is set to "1" if the condition is satisfied, whereas a flag "flg" is set to "0" if the condition is not satisfied.

$$|LineD5-LineD6|>LevNDc \qquad (20)$$

$$|LineD7-LineD8|>LevNDd \qquad (21)$$

Here, LevNDc, LevNDd are predetermined threshold values. For example, if LineD5=100, LineD6=300 and LevNDc=40, then the condition of Equation (20) is satisfied, resulting in flag flg=1. Equation (20) corresponds to a rightwardly diagonal edge judgment unit, and Equation (21) above corresponds to a leftwardly diagonal edge judgment unit.

When flag flg=1, an R pixel is newly set at the position of the B pixel if the pixel targeted for signal processing is a B pixel (step S40). Here, the average values of the W pixels, G pixels and B pixels in the pixel block are found, and subtraction processing is performed in accordance with Equation (22).

$$R1=aW_{average}-(bB_{average}+cG_{average}) \qquad (22)$$

Here, a, b, c are coefficients determined by the sensitivity ratios of the respective pixels. For example, if $W_{average}$=150, $B_{average}$=100 and $G_{average}$=100, then R1=100 when a=1.2, b=0.4 and c=0.4.

Likewise, in the case of flag flg=1, a B pixel is newly set at the position of the R pixel if the pixel targeted for signal processing is an R pixel in accordance with Equation (23) (step S41).

$$B1=dW_{average}-(eB_{average}+fG_{average}) \qquad (22)$$

Steps S40, S41 correspond to a color addition processing unit. When the processing in steps S35, S36, S40, S41 is finished, color interpolation processing is performed (step S37).

As described above, in the fourth embodiment, in the case of employing a pixel arrangement in which only two colors of the three RGB colors appear in rightwardly diagonal and leftwardly diagonal directions, the pixel of a nonexistent color is virtually set as a signal target pixel, such that it is possible to inhibit the generation of aliasing in which a particular color component alone is strong, and an RGB image with a satisfactory SN ratio can be obtained.

The invention claimed is:

1. A solid-state image sensing device, comprising:
a plurality of pixels formed on a semiconductor substrate in matrix form, each having a photoelectric conversion element;
a read-out circuit configured to read out electric signals obtained by the photoelectric conversion element in the plurality of pixels; and
a signal processing unit configured to perform signal processing for the electric signal read out from the read-out circuit,
wherein the plurality of pixels includes:
a first pixel configured to lead an incident light of visible light wavelength to the photoelectric conversion element via a transparent film;
a plurality of second pixels, each having a first color filter with a higher transmittance for a first visible light wavelength region than that for the other visible light wavelength region;
a plurality of third pixels, each having a second color filter with a higher transmittance for a second visible light wavelength region different from the first visible light wavelength than that for the other visible light wavelength region; and
a plurality of fourth pixels, each having a third color filter with a higher transmittance for a third visible light wavelength region different from the first and second visible light wavelengths than that for the other visible light wavelength region, and
the signal processing unit performs the signal processing in units of a pixel block having at least the first to fourth pixels, and includes:
a color acquisition unit configured to acquire a white pixel value corresponding to the first pixel of white color in the pixel block, a first color pixel value corresponding to the second pixel of a first color, a second color pixel value corresponding to the third pixel of a second color and a third color pixel value corresponding to the fourth pixel of a third color;
an edge judgment unit configured to judge whether an edge is present around the first pixel which is a target pixel for the signal processing in the pixel block;
a color separation unit configured to calculate color ratios for the first pixel based on the first to third color pixel values around the first pixel, and multiply the calculated color ratios by the white pixel value of the first pixel to color-separate the first pixel and calculate the first to third color pixel values for the first pixel when the edge judgment unit judges that an edge is not present around the target pixel; and
a single color pixel calculation unit configured to calculate a single color pixel value by assuming the first pixel as an other single color except white without calculating the color ratios when the edge judgment unit judges that an edge is present around the target pixel, said other single color used to obtain luminance information.

2. The device according to claim 1, wherein the color separation unit color-separates the white pixel value (W) by using the first to third color pixel values $C_1, C_2, C_3$ in the pixel block to calculate a first color pixel value $C_{1w}$, a second color pixel value $C_{2w}$ and a third color pixel value $C_{3w}$, based on the following Equations (1) to (4), in which m is an arbitrary variable from 1 to 3, and $K_m$ are color ratios expressed by a signal intensity ratio:

$$C_{1W} \leftarrow W \cdot K_1 \qquad (1)$$

$$C_{2W} \leftarrow W \cdot K_2 \qquad (2)$$

$$C_{3W} \leftarrow W \cdot K_3 \qquad (3)$$

$$K_m = \frac{C_m}{(C_1 + C_2 + C_3)}. \qquad (4)$$

3. The device according to claim 1, wherein the edge judgment unit includes:
a vertical line edge judgment unit configured to judge whether a difference between a total value of color pixel values of a plurality of pixels on a vertical line including a white target pixel for the signal processing in the pixel block and a total value of color pixel values of a plurality of pixels on two vertical lines arranged at both sides of the vertical line including the white target pixel exceeds a first reference value;
a horizontal line edge judgment unit configured to judge whether a difference between a total value of color pixel values of a plurality of pixels on a horizontal line including the white target pixel and a total value of color pixel values of a plurality of pixels on two horizontal lines arranged at both sides of the horizontal line including the white target pixel exceeds a second reference value; and
a diagonal line edge judgment unit configured to judge whether a difference between a total value of color pixel values of a plurality of pixels on a diagonal line including the white target pixel and a total value of color pixel values of a plurality of pixels on two diagonal lines arranged at both sides of the diagonal line including the white target pixel exceeds a third reference value,
when judgment by at least one of the vertical line edge judgment unit, horizontal line edge judgment unit and diagonal line edge judgment unit is affirmative, the edge judgment unit judging that the edge is present around the white target pixel.

4. The device according to claim 3, wherein the diagonal line edge judgment unit includes:
a rightwardly diagonal line edge judgment unit configured to judge whether a difference between a total value of color pixel values of a plurality of pixels on a rightwardly diagonal line including the white target pixel and a total value of color pixel values of a plurality of pixels on two rightwardly diagonal lines arranged at both sides of the rightwardly diagonal line including the white target pixel exceeds a fourth reference value; and
a leftwardly diagonal line edge judgment unit configured to judge whether a difference between a total value of color pixel values of a plurality of pixels on a leftwardly diagonal line including a white target pixel and a total value of color pixel values of a plurality of pixels on two leftwardly diagonal lines arranged at both sides of the leftwardly diagonal line including the white target pixel exceeds a fifth reference value, when judgment by at least one of the vertical line edge judgment unit, horizontal line edge judgment unit, rightwardly diagonal line edge judgment unit and leftwardly diagonal line edge judgment unit is affirmative, the edge judgment unit judging that the edge is present around the white target pixel.

5. The device according to claim 3, wherein:
three vertical lines used by the vertical line edge judgment unit are adjacently arranged, or arranged at one pixel interval, respectively;
three horizontal lines used by the horizontal line edge judgment unit are adjacently arranged, or arranged at one pixel interval, respectively; and
three diagonal lines used by the diagonal line edge judgment unit are adjacently arranged, or arranged at one pixel interval, respectively.

6. The device according to claim 5, wherein:
the three vertical lines used by the vertical line edge judgment unit are arranged at one pixel interval, respectively, pixel types and pixel sequences on each vertical line being the same;
the three horizontal lines used by the horizontal line edge judgment unit are arranged at one pixel interval, respectively, pixel types and pixel sequences on each horizontal line being the same; and
the three diagonal lines used by the diagonal line edge judgment unit are arranged at one pixel interval, respectively, pixel types and pixel sequences on each diagonal line being the same.

7. The device according to claim 1, wherein the edge judgment unit includes:
a vertical line edge judgment unit configured to judge whether a difference between total values of color pixel values of a plurality of pixels on two vertical lines arranged at both sides of the vertical line including a white target pixel for a signal processing in the pixel block exceeds a first reference value;
a horizontal line edge judgment unit configured to judge whether a difference between total values of color pixel values of a plurality of pixels on two vertical lines arranged at both sides of the horizontal line including the white target pixel in the pixel block exceeds a second reference value; and
a diagonal line edge judgment unit configured to judge whether a difference between total values of color pixel values of a plurality of pixels on two diagonal lines arranged at both sides of the diagonal line including the white target pixel in the pixel block exceeds a third reference value, when judgment of at least one of the vertical line edge judgment unit, horizontal line edge judgment unit and diagonal line edge judgment unit is affirmative, the edge judgment unit judging that the edge is present around the white target pixel.

8. The device according to claim 7, wherein the diagonal line edge judgment unit includes:
a rightwardly diagonal line edge judgment unit configured to judge whether a difference between total values of color pixel values of a plurality of pixels on two rightwardly diagonal lines arranged at both sides of the rightwardly diagonal line including the white target pixel in the pixel block exceeds a fourth reference value; and
a leftwardly diagonal line edge judgment unit configured to judge whether a difference between total values of color pixel values of a plurality of pixels on two leftwardly diagonal lines arranged at both sides of the rightwardly diagonal line including the white target pixel in the pixel block exceeds a fifth reference value, when judgment of at least one of the vertical line edge judgment unit, horizontal line edge judgment unit, rightwardly diagonal line edge judgment unit and leftwardly diagonal line edge judgment unit is affirmative, the edge judgment unit judging that the edge is present around the white target pixel.

9. The device according to claim 1, wherein the color separation unit converts a pixel value for a white target pixel for a signal processing into a green pixel value.

10. The device according to claim 1, further comprising an interpolation processing unit configured to adjust color pixel values around the white pixel by using the first to third color pixel values generated by the color separation unit.

11. The device according to claim 10, wherein the interpolation processing unit adjusts the color pixel values of pixels around the white pixel by using the first to third color pixel values generated by the color separation unit so that pixel arrangement in the pixel block is a Bayer arrangement.

12. The device according to claim 2, wherein:
the edge judgment unit specifies a pixel area which includes the white pixel and in which no edge is present in the pixel block including a white target pixel for a signal processing; and
the color separation unit color-separates the white pixel value based on the Equations (1) to (4) by using the first to third color pixel values C1, C2 and C3 which is present in the pixel area specified by the edge judgment unit, to calculate the first to third color pixel values $C_{1w}$, $C_{2w}$ and $C_{3w}$.

13. A solid-state image sensing device, comprising:
a plurality of pixels formed on a semiconductor substrate in matrix form, each having an photoelectric conversion element;
a read-out circuit configured to read out electric signals obtained by the photoelectric conversion element in the plurality of pixels; and
a signal processing unit configured to perform signal processing for the electric signal read out from the read-out circuit,
wherein the plurality of pixels includes:
a first pixel configured to lead an incident light of visible light wavelength to the photoelectric conversion element via a transparent film;
a plurality of second pixels, each having a first color filter with a higher transmittance for a first visible light wavelength region than that for the other visible light wavelength region;
a plurality of third pixels, each having a second color filter with a higher transmittance for a second visible light wavelength region different from the first visible light wavelength than that for the other visible light wavelength region; and
a plurality of fourth pixels, each having a third color filter with a higher transmittance for a third visible light wavelength region different from the first and second visible light wavelengths than that for the other visible light wavelength region, and
the signal processing unit performs the signal processing in units of a pixel block having at least the first to fourth pixels, and includes:
a color acquisition unit configured to acquire a white pixel value corresponding to the first pixel of white color in the pixel block, a first color pixel value corresponding to the second pixel of a first color, a second color pixel value corresponding to the third pixel of a second color and a third color pixel value corresponding to the fourth pixel of a third color;

an edge judgment unit configured to judge whether an edge is present around the third or fourth pixel which is a target pixel for a signal processing in the pixel block; and a color addition processing unit configured to output the color pixel value of the target pixel without modification when it is judged that no edge is present around the target pixel, and add the third color pixel value to the color pixel value of the target pixel if the target pixel is the third pixel or add the second color pixel value to the color pixel value of the target pixel if the target pixel is the fourth pixel when the target pixel is the fourth pixel when it is judged that edge is present around the target pixel.

14. The device according to claim 13, wherein:

the first color corresponding to the second pixel is green, one of the second and third colors corresponding to the third and fourth pixels is red, and the other is blue;

a ratio of the third and fourth pixels in the pixel block is less than a ratio of the second pixel in the pixel block; and a ratio of the second pixel in the pixel block is less than a ratio of the first pixel.

15. The device according to claim 14, wherein the edge judgment unit judges that the edge is present around the target pixel when a difference between total values of the color pixel values on two diagonal lines at both sides by sandwiching the target pixel exceeds a predetermined threshold value.

16. The device according to claim 15, wherein the edge judgment unit includes:

a rightwardly diagonal edge judgment unit configured to judge whether a difference between total values of the color pixel values on two rightwardly diagonal lines at both sides by sandwiching the target pixel exceeds a predetermined threshold value; and a leftwardly diagonal edge judgment unit configured to judge whether a difference between total values of the color pixel values on two leftwardly diagonal lines at both sides by sandwiching the target pixel exceeds a predetermined threshold value, when judgment by at least one of the rightwardly diagonal edge judgment unit and the leftwardly diagonal edge judgment unit is affirmative, the edge judgment unit judging that the edge is present around the target pixel.

17. The device according to claim 1, wherein:

the pixel block includes the first to fourth pixels of two rows and two columns arranged adjacently; and the first and second pixels in the pixel block are arranged diagonally.

18. The device according to claim 13, wherein the pixel block has the first pixels arranged in a staggered form, and the second, third and fourth pixels arranged at a ratio of 2:1:1 between the first pixels.

19. The device according to claim 1, wherein:

the signal processing unit is formed on a semiconductor substrate different from the semiconductor substrate on which the plurality of pixels and the read-out circuit are formed; and an output of the read-out circuit is inputted to the signal processing unit.

20. The device according to claim 13, wherein:

the signal processing unit is formed on a semiconductor substrate different from the semiconductor substrate on which the plurality of pixels and the read-out circuit are formed; and an output of the read-out circuit is inputted to the signal processing unit.

* * * * *

UNITED STATES PATENT AND TRADEMARK OFFICE
CERTIFICATE OF CORRECTION

| | | |
|---|---|---|
| PATENT NO. | : 8,045,033 B2 | Page 1 of 1 |
| APPLICATION NO. | : 12/278347 | |
| DATED | : October 25, 2011 | |
| INVENTOR(S) | : Hiroto Honda et al. | |

It is certified that error appears in the above-identified patent and that said Letters Patent is hereby corrected as shown below:

On the title page, Item (75), the second Inventor's name is incorrect. Item (75) should read:

-- (75) Inventors:  Hiroto Honda, Yokohama (JP); Yoshinori Iida, Tokyo (JP); Yoshitaka Egawa, Yokohama (JP) --

Signed and Sealed this
Twentieth Day of December, 2011

David J. Kappos
*Director of the United States Patent and Trademark Office*